US012812026B2

(12) United States Patent
Urman et al.

(10) Patent No.: US 12,812,026 B2
(45) Date of Patent: Nov. 24, 2026

(54) STEERING ASSISTED PARSING SYSTEM

(71) Applicant: MELLANOX TECHNOLOGIES, LTD., Yokneam (IL)

(72) Inventors: Avi Urman, Yokneam (IL); Doron Shriki, Kiryat Ata (IL); Amir Sharaffy, Ashkelon (IL); Nofit Bitton, Meitar (IL)

(73) Assignee: Mellanox Technologies, Ltd., Yokneam (IL)

( * ) Notice: Subject to any disclaimer, the term of this patent is extended or adjusted under 35 U.S.C. 154(b) by 195 days.

(21) Appl. No.: 18/665,620

(22) Filed: May 16, 2024

(65) Prior Publication Data

US 2025/0358348 A1 Nov. 20, 2025

(51) Int. Cl.
*H04L 69/22* (2022.01)

(52) U.S. Cl.
CPC .................................... *H04L 69/22* (2013.01)

(58) Field of Classification Search
None
See application file for complete search history.

(56) References Cited

U.S. PATENT DOCUMENTS

2003/0031172 A1* 2/2003 Grinfeld ................ G06Q 40/04 370/389
2015/0081726 A1* 3/2015 Izenberg ............... G06F 16/134 707/755
2015/0110113 A1* 4/2015 Levy ....................... H04L 69/18 370/392
2015/0156288 A1* 6/2015 Lu .......................... H04L 69/22 370/392
2019/0215384 A1* 7/2019 Kfir ......................... H04L 45/74
2020/0120191 A1* 4/2020 Thantry ................ H04L 45/745
2021/0176345 A1* 6/2021 Urman .................... H04L 69/22
2021/0185153 A1* 6/2021 Kittner .................... H04L 69/26
2021/0328923 A1* 10/2021 Urman .................... H04L 69/12
2023/0127568 A1* 4/2023 Levy ..................... H04L 69/324
2025/0233933 A1* 7/2025 Lin ......................... H04L 69/22

* cited by examiner

*Primary Examiner* — Phyllis A Book
(74) *Attorney, Agent, or Firm* — Meitar Patents LTD.; Daniel Kligler

(57) ABSTRACT

In one embodiment, a network device includes an interface to receive packets over a network, a parser engine to receive data of a header section of a packet, and parse at least one first part of the header section yielding first parsed data, and a steering engine to receive the first parsed data, generate a parsing information for use in parsing at least one second part of the header section, and provide the parsing information to the parser engine, wherein: the parser engine is to parse the at least one second part of the header section based on the parsing information yielding second parsed data, and the steering engine is to perform an action based on the second parsed data.

28 Claims, 13 Drawing Sheets

STEERING ASSISTED PARSING SYSTEM

FIELD OF THE INVENTION

The present invention relates to network equipment, and in particular, but not exclusively to, parsers.

BACKGROUND

As a first step in deciding how to forward a given packet, a router (or other network device) generally parses the header section of packet, i.e., identifies the fields in the header section that contain relevant information and extracts the information from these fields that is to be used by steering logic. This sort of header parsing, along with other packet processing operations, is generally carried out by hardware logic and therefore lacks the flexibility of software-driven processing. Handling new or custom packet headers and/or options, for example, options in the IPv4 header, can be particularly challenging in this context, since in contrast to the fixed structure of the basic header, the new or custom headers and choice of optional records and their order can vary from packet to packet. Similar problems arise in parsing of other protocol headers that can include variable options, such as the TCP header.

US20190215384 of Kfir, et al., describes a communication apparatus including multiple interfaces configured to be connected to a network so as to receive and transmit data packets having respective packet headers that includes a basic header record and one or more optional records. Parsing instructions specify one or more types of the optional records and indicate, for each specified type, an offset within an optional record of the specified type. Upon receiving each packet, routing logic parses the basic header record in the packet, parses the one or more optional records so as to identify any optional records of the one or more specified types, extracts header data from the identified optional records at the offset indicated for the specified type, and processes and forwards the data packets via the interfaces to the network in accordance with information parsed from the basic header record and the extracted header data.

SUMMARY

There is provided in accordance with an embodiment of the present disclosure, a network device, including an interface to receive packets over a network, a parser engine to receive data of a header section of a packet, and parse at least one first part of the header section yielding first parsed data, and a steering engine to receive the first parsed data, generate parsing information for use in parsing at least one second part of the header section, and provide the parsing information to the parser engine, wherein the parser engine is to parse the at least one second part of the header section based on the parsing information yielding second parsed data, and the steering engine is to perform an action based on the second parsed data.

Further in accordance with an embodiment of the present disclosure the steering engine is to perform a computation based on the first parsed data, and generate the parsing information based on a result of the computation.

Still further in accordance with an embodiment of the present disclosure the parsing information includes an indication of a location in the header section of a given header to parse, and an indication of a protocol of the given header.

Additionally in accordance with an embodiment of the present disclosure the parsing information includes an indication of a protocol of a given header.

Moreover in accordance with an embodiment of the present disclosure the parsing information includes an indication of a location in the header section of a given field to parse, and a length of the given field.

Further in accordance with an embodiment of the present disclosure the parsing information includes an indication of a first header of the header section, an offset in the header section from the first header to a second header to parse, and an indication of a protocol of the second header.

Still further in accordance with an embodiment of the present disclosure the parser engine is to parse multiple headers of the header section yielding the first parsed data until reaching an unknown header, the steering engine is to perform a multi-field lookup based on the first parsed data to identify the unknown header as a header of a given protocol, the steering engine is to generate the parsing information to include an indication of the given protocol and an indication of a location of the unknown header, the parser engine is to find the unknown header based on the indication of the location in the parsing information, and the parser engine is to parse the unknown header the given protocol based on the indication of the given protocol included in the parsing information yielding the second parsed data.

Additionally in accordance with an embodiment of the present disclosure the given protocol of the unknown header is a security protocol, the steering engine is to decrypt the packet based on the second parsed data and the security protocol yielding a decrypted packet, the steering engine is to find a trailer of the decrypted packet, the steering engine is to find a next protocol of a next header of the header section based on the found trailer, the steering engine is to compute additional parsing information including an indication of a location of the next header and an indication of the next protocol, the steering engine is to provide the additional parsing information to the parser engine, the parser engine is to find the next header based on the indication of the location in the additional parsing information, and the parser engine is to parse the next header the next protocol based on the indication of the next protocol included in the additional parsing information yielding third parsed data.

Moreover in accordance with an embodiment of the present disclosure the steering engine is to decrypt the packet based on the first parsed data yielding a decrypted packet, the steering engine is to find a trailer of the decrypted packet, the steering engine is to find a next protocol of a next header of the header section based on the found trailer, the steering engine is to compute the parsing information including an indication of a location of the next header and an indication of the next protocol, the steering engine is to provide the parsing information to the parser engine, the parser engine is to find the next header based on the indication of the location in the parsing information, and the parser engine is to parse the next header the next protocol based on the indication of the next protocol included in the parsing information yielding the second parsed data.

Further in accordance with an embodiment of the present disclosure the first parsed data includes flags, the steering engine is to compute a weighted sum of the flags yielding an indication of a location of a given part of the header section, the steering engine is to generate the parsing information to include the indication of the location of the given part, and the parser engine is to find and parse the given part based on the indication of the location in the parsing information yielding the second parsed data.

Still further in accordance with an embodiment of the present disclosure the given part is an optional type-length-value (TLV) header.

Additionally in accordance with an embodiment of the present disclosure the first parsed data includes a segment identification field, the header section includes multiple segments, the steering engine is to compute an indication of a location of a current segment of the multiple segments based on the segment identification field, the steering engine is to generate the parsing information to include the indication of the location of the current segment, and the parser engine is to find and parse the current segment based on the indication of the location in the parsing information yielding the second parsed data.

Moreover in accordance with an embodiment of the present disclosure the first parsed data includes a segment identification field, the header section includes multiple segments with corresponding addresses, the steering engine is to compute an indication of a location of a current segment of the multiple segments based on the segment identification field, the steering engine is to generate the parsing information to include the indication of the location of the current segment, the parser engine is to find and parse the current segment based on the indication of the location in the parsing information yielding the second parsed data including a given destination address of the addresses, the steering engine is to add the given destination address to a destination address field in the header section, and the steering engine is to cause the packet to be forwarded to a device identified by the destination address field.

Further in accordance with an embodiment of the present disclosure the segment identification field is a segments left value, and the steering engine is to reduce the segment left value by one.

There is also provided in accordance with another embodiment of the present disclosure, a networking method, including receiving packets over a network, parsing at least one first part of a header section of a packet yielding first parsed data, and generating parsing information in a steering engine for use in parsing at least one second part of the header section, providing the parsing information to a parser engine, parsing the at least one second part of the header section based on the parsing information yielding second parsed data, and performing an action in the steering engine based on the second parsed data.

Still further in accordance with an embodiment of the present disclosure, the method includes performing a computation in the steering engine based on the first parsed data, and generating the parsing information in the steering engine based on a result of the computation.

Additionally in accordance with an embodiment of the present disclosure the parsing information includes an indication of a location in the header section of a given header to parse, and an indication of a protocol of the given header.

Moreover in accordance with an embodiment of the present disclosure the parsing information includes an indication of a protocol of a given header.

Further in accordance with an embodiment of the present disclosure the parsing information includes an indication of a location in the header section of a given field to parse, and a length of the given field.

Still further in accordance with an embodiment of the present disclosure the parsing information includes an indication of a first header of the header section, an offset in the header section from the first header to a second header to parse, and an indication of a protocol of the second header.

Additionally in accordance with an embodiment of the present disclosure, the method includes parsing multiple headers of the header section yielding the first parsed data until reaching an unknown header, performing a multi-field lookup based on the first parsed data to identify the unknown header as a header of a given protocol, generating the parsing information to include an indication of the given protocol and an indication of a location of the unknown header, finding the unknown header based on the indication of the location in the parsing information, and parsing the unknown header the given protocol based on the indication of the given protocol included in the parsing information yielding the second parsed data.

Moreover in accordance with an embodiment of the present disclosure the given protocol of the unknown header is a security protocol, the method further including decrypting the packet based on the second parsed data and the security protocol yielding a decrypted packet, finding a trailer of the decrypted packet, finding a next protocol of a next header of the header section based on the found trailer, computing additional parsing information including an indication of a location of the next header and an indication of the next protocol, providing the additional parsing information to the parser engine, finding the next header based on the indication of the location in the additional parsing information, and parsing the next header the next protocol based on the indication of the next protocol included in the additional parsing information yielding third parsed data.

Further in accordance with an embodiment of the present disclosure, the method includes decrypting the packet based on the first parsed data yielding a decrypted packet, finding a trailer of the decrypted packet, finding a next protocol of a next header of the header section based on the found trailer, computing the parsing information including an indication of a location of the next header and an indication of the next protocol, providing the parsing information to the parser engine, finding the next header based on the indication of the location in the parsing information, and parsing the next header the next protocol based on the indication of the next protocol included in the parsing information yielding the second parsed data.

Still further in accordance with an embodiment of the present disclosure the first parsed data includes flags, the method further including computing a weighted sum of the flags yielding an indication of a location of a given part of the header section, generating the parsing information to include the indication of the location of the given part, and finding and parsing the given part based on the indication of the location in the parsing information yielding the second parsed data.

Additionally in accordance with an embodiment of the present disclosure the given part is an optional type-length-value (TLV) header.

Moreover in accordance with an embodiment of the present disclosure the first parsed data includes a segment identification field, and the header section includes multiple segments, the method further including computing an indication of a location of a current segment of the multiple segments based on the segment identification field, generating the parsing information to include the indication of the location of the current segment, and finding and parsing the current segment based on the indication of the location in the parsing information yielding the second parsed data.

Further in accordance with an embodiment of the present disclosure the first parsed data includes a segment identification field, and the header section includes multiple segments with corresponding addresses, the method further including computing an indication of a location of a current segment of the multiple segments based on the segment identification field, generating the parsing information to include the indication of the location of the current segment, finding and parsing the current segment based on the indication of the location in the parsing information yielding the second parsed data including a given destination address of the addresses, adding the given destination address to a destination address field in the header section, and causing the packet to be forwarded to a device identified by the destination address field.

Still further in accordance with an embodiment of the present disclosure the segment identification field is a segments left value, the method further including reducing the segment left value by one.

BRIEF DESCRIPTION OF THE DRAWINGS

The present invention will be understood from the following detailed description, taken in conjunction with the drawings in which.

DESCRIPTION OF EXAMPLE EMBODIMENTS

Overview

Figure 1:
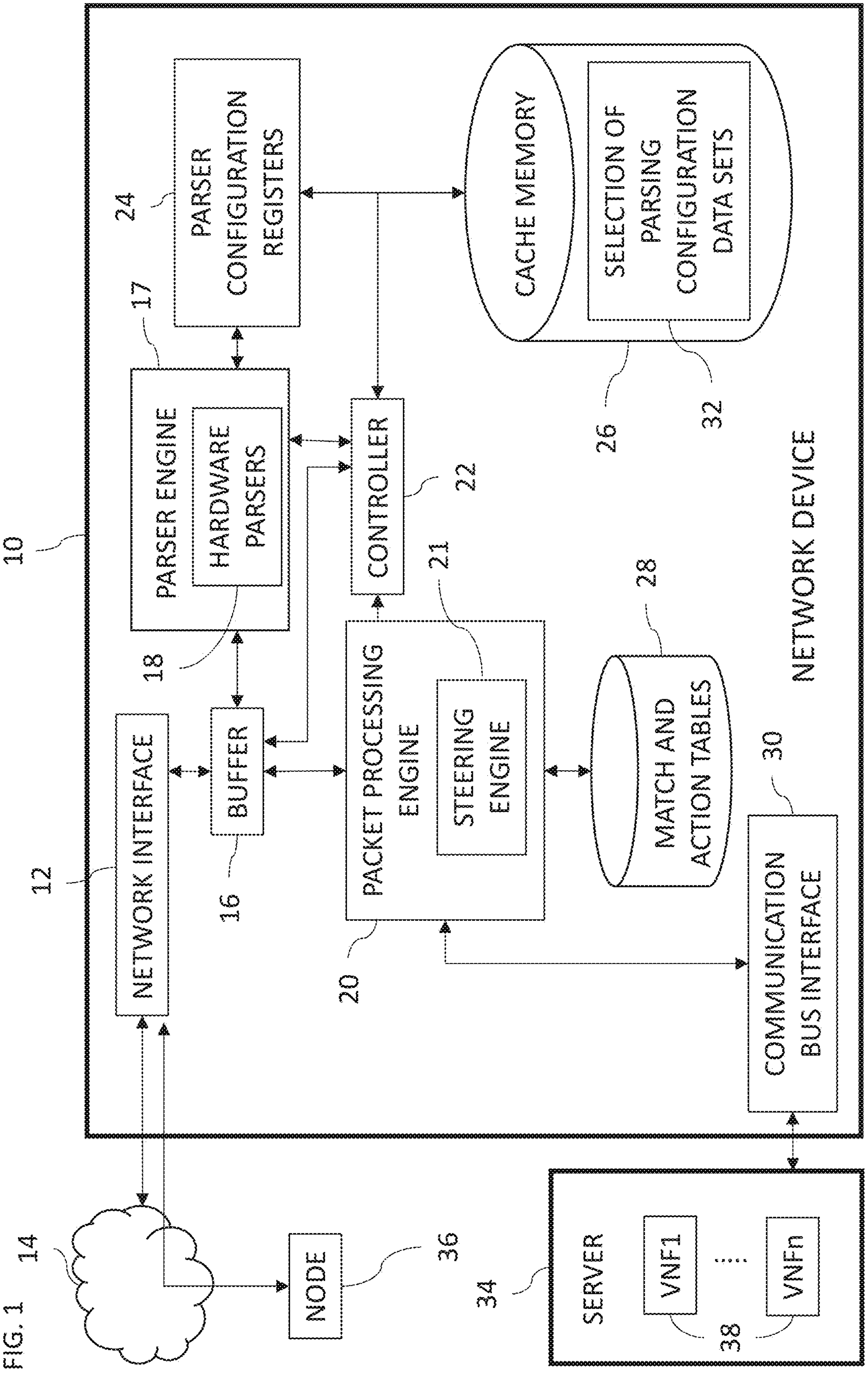
FIG. 1 is a block diagram view of a network device constructed and operative in accordance with an embodiment of the present invention.

As previously mentioned, header parsing, along with other packet processing operations, is generally carried out by hardware logic and therefore lacks the flexibility of software-driven processing. Handling new or custom packet headers and/or options can be particularly challenging in this context, since in contrast to the fixed structure of the basic header, the new or custom headers and choice of optional records and their order can vary from packet to packet.

One possible response to this difficulty, which may be adopted in simpler devices, is to parse only the basic header and skip over the options and other new or custom formats. Even if parsing all the headers is not necessary in order to comply with the relevant standards, some network functions, such as network security and route monitoring, may not be supported if these headers are skipped.

One solution is to provide a network device including flexible hardware parsers that parse headers of a header section using parser configuration data stored in registers. The parser configuration data may be updated as needed thereby providing flexibility so that the flexible hardware parsers may be configured to parse different headers of different lengths and formats even after the hardware of the network device has been manufactured. A default parser configuration data set may be loaded into the registers for an initial parsing round of a given packet and provides configuration for different flexible hardware parsers for parsing the header of the given packet in the initial parsing round. After the parsed data of the given packet header is processed by the network device, a different (e.g., more specific) configuration data set may be loaded into the registers for the next round of parsing of the given packet header to provide a different configuration for the different hardware parsers.

Another solution is to load parser configuration data into the registers on demand so that when the protocol of the next header is known, the parser configuration associated with that protocol is loaded into one of the flexible hardware parsers in order for that flexible hardware parser to parse the next header according to that protocol. In this manner, there is no need to load configuration data of flexible hardware parsers that will not be used.

Using flexible hardware parsers with suitable configuration data allows handling of many new or custom packet headers and/or options. However, extracting certain data from headers may still be complex, and in some cases impossible, even when using flexible hardware parsers alone.

Therefore, embodiments of the present invention address at least some of the above drawbacks by processing parsed header data of a packet in a steering engine to generate parsing information (e.g., parsing hints) to be provided for use by a parser engine to reparse the header section of the packet based on the parsing information. The parsing information includes information describing how to continue to parse the packet header section. In some embodiments, the steering engine may perform a computation or computations on the parsed header data, or part thereof, to yield the parsing information. The computation(s) performed by the steering engine is/(are) not simply based on match-and-action processing described herein, but includes an additional computation(s). The computation(s) may be based on a function which is called based on an action found in a match-and-action table.

The parsing information may include data about a protocol of a next header in the header section of the packet (e.g., a name of the protocol or a length of the protocol header), and may include a location of the next header within the header section (e.g., with respect to the beginning of the header section or with respect to another header in the header section). The parsing information may include location data of a specific field or fields in the header section (e.g., a location of the field in the header section or in a given header and a length of the field) to be parsed and provided to the steering engine for processing.

In some embodiments, the steering engine may find the protocol of an unknown header using a multi-field lookup (e.g., a 5-tuple lookup of 5-tuple data such as source IP address/port number, destination IP address/port number, and the protocol in use) and indicate the found protocol and/or its location in the header section using the parsing information provided to the parser engine. In some embodiments, the steering engine may determine the protocol of the next header based on a trailer of the packet. In some cases, the packet may need to be decrypted to allow access to the trailer of the packet.

In some embodiments, the steering engine may compute a weighted sum of flags (included in the parsed header data) in order to determine the location of an optional field and provide the location of the optional field in the parsing information to the parser engine to extract from the optional field from the header section.

In some embodiments, the steering engine may find the location of a current segment (of a list of segments) based on data (e.g., a segment identification field) included in the parsed header data. The steering engine then prepares the parsing information to include an indication of the location of the current segment. The parsing information may then be used by the parser engine to extract the current segment from the header section of the packet. In some embodiments, the data of the current segment may include a destination address of a next hop for the packet. The steering engine may receive the data of the current segment parsed by the parsing engine and add the destination address included in the parsed data to a destination address field of the packet and forward the packet to a device indicated by the destination address now added to the destination address field.

System Description

Reference is now made to FIG. 1, which is a block diagram view of a network device 10 constructed and operative in accordance with an embodiment of the present invention. The network device 10 may be any suitable device, for example, but not limited to, a router, a switch, or a network interface card. The network device 10 includes at least one network interface 12 configured to operate as at least one ingress port and at least one egress port for receiving packets from, and sending packets to, a packet data network 14.

The network device 10 also includes a memory 16 (e.g., buffer), a parser engine 17 including hardware parsers 18, a packet processing engine 20, a controller 22, parser configuration registers 24, a cache memory 26, match and action tables 28, and optionally a communication bus interface 30.

Packets received by the network interface 12 are stored in the buffer 16. Header sections of the received packets are parsed by the hardware parsers 18 which are controlled by the controller 22, typically under instruction of the packet processing engine 20. At least some of the hardware parsers 18 parse the header sections according to data loaded into the parser configuration registers 24. The cache memory 26 caches a selection of parser configuration data sets 32, which are selectively loaded into the parser configuration registers 24 from the cache memory 26 by the controller 22 under instruction from the packet processing engine 20.

The hardware parsers 18 parse the various headers included in the header sections of packets and may optionally extract additional information from the header sections. The parsed information is stored in the buffer 16 for retrieval by the packet processing engine 20 and/or sent to the packet processing engine 20. In some embodiments, the header section is also sent by the hardware parsers 18 to the packet processing engine 20. Operation of the hardware parsers 18 and the selection of parser configuration data sets 32 are described in more detail below with reference to FIGS. 2-8.

The packet processing engine 20 uses the match and action tables 28 to determine how each packet should be processed according to the parsed information generated by the hardware parsers 18. The match and action tables 28 include data to match to the parsed information, and associated actions to be performed when a match is found. The data to be matched may include any field from the packet, for example, MAC or IP addresses, security information, Transmission Control Protocol (TCP) data, User Datagram Protocol (UDP) data, Virtual Extensible Local Area Network (VXLAN) data, Generic Routing Encapsulation (GRE) data, and Generic Network Virtualization Encapsulation (GENEVE) data, by way of example only. The actions may include any suitable action or actions per match, for example, but not limited to, reparsing the header section using a different parse graph (described in more detail with reference to FIG. 7), sending the packet to a given network node 36 via the packet data network 14, sending the packet to a server 34 connected to the network device 10 via the communication bus interface 30, amending the header section, adding a new header, and/or removing a header, e.g., VLAN or Multi-Protocol Label Switching (MPLS). The communication bus interface 30 may operate in accordance with any suitable protocol, for example, but not limited to, PCIe (peripheral component interconnect express) interface standard.

For example, if a MAC address in the header section is matched to a given MAC address, then the packet header is to be reparsed by the hardware parsers 18 after a given parse graph is loaded. In this example, the packet processing engine instructs the controller 22 to load parse graph A from the cache memory 26 and send the header section, or a link to the header section in the buffer 16, to the hardware parsers 18 so that the header section can be reparsed according to parse graph A. By way of another example, if the parsed information includes data B, then the packet is forwarded to server C via the communication bus interface 30. By way of an additional example, if the parsed information includes data D, then the header section is amended. By way of yet another example, if the parsed information includes data E, then the packet is sent back to the packet data network 14 on port F. One or more actions may be associated with a single match. The packet processing engine 20 may include a steering engine 21 to perform steering functions such as matching parsed data in the match and action tables 28 and performing actions indicated in the matches of the match and action tables 28.

The functionality of the packet processing engine 20 is also described with reference to FIG. 6. In practice, some or all of the functions of the packet processing engine 20 may be combined in a single physical component or, alternatively, implemented using multiple physical components. These physical components may comprise hard-wired or programmable devices, or a combination of the two. In some embodiments, at least some of the functions of the packet processing engine 20 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

The functionality of the controller 22 is also described with reference to FIG. 6. In practice, some or all of the functions of the controller 22 may be combined in a single physical component or, alternatively, implemented using multiple physical components. These physical components may comprise hard-wired or programmable devices, or a combination of the two. In some embodiments, at least some of the functions of the controller 22 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

In some embodiments, the functionality of the controller 22 may be implemented in the packet processing engine 20.

In the example of FIG. 1, the network device 10 may be implemented as a network interface card for the server 34. The server 34 may include multiple virtual network functions (VNFs) 38. Each virtual network function 38 may include one or more virtual machines (VMs). A hypervisor running on the server 34 may implement the VMs. In some examples, different VMs may be operated for different customers, each having their own parsing and packet processing requirements. Each customer may want to be able to configure the hardware parsers 18 of the network device 10 according to their own requirements. However, as the number of hardware parsers 18 is limited, the hardware parsers 18 cannot be programed with a single parser configuration data set to parse the data of the different customers according to the customers' needs. When a packet is received in the buffer 16, the hardware parsers 18 parse at least some of the header section according to a default parse graph. The packet processing engine 20 uses the match and action tables 28 to determine what action should be performed. One action may include reparsing the header section using the specific parse graph for the customer or VM associated with the header section. For example, a MAC address included in the header section may indicate the VM associated with this header section.

Figure 2:
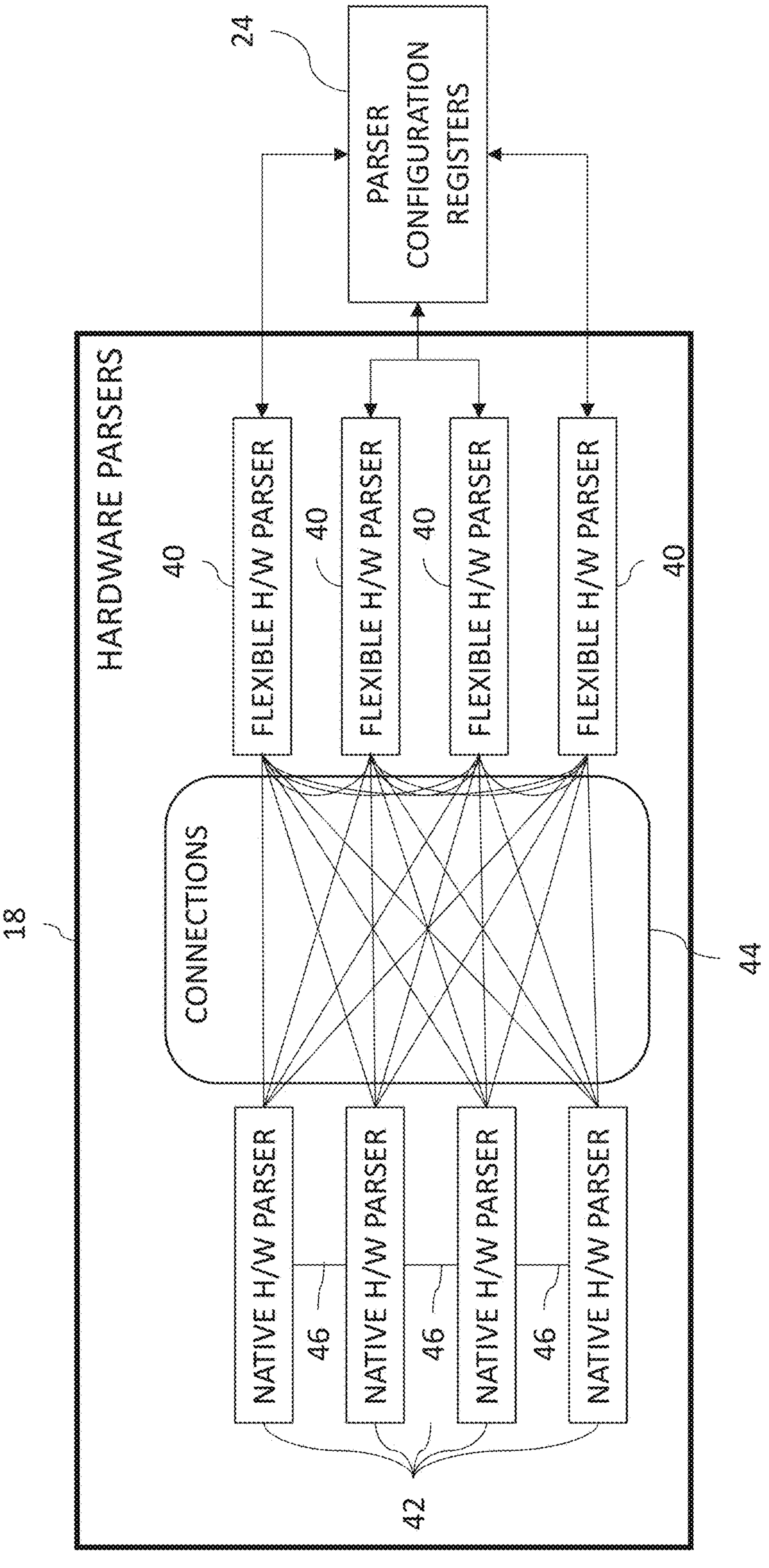
FIG. 2 is a block diagram view of hardware parsers in the device of FIG. 1 operative in accordance with an embodiment of the present invention.

Reference is now made to FIG. 2, which is a block diagram view of the hardware parsers 18 in the device 10 of FIG. 1 operative in accordance with an embodiment of the present invention. The hardware parsers 18 include flexible hardware parsers 40 and optionally one or more native hardware parsers 42 as shown in FIG. 2. The flexible hardware parsers 40 are configured to parse header section data according to the data in the parser configuration registers 24. The flexible hardware parsers 40 are therefore reconfigurable even after the network device 10 has been manufactured. The native hardware parsers 42 on the other hand are not generally reconfigurable after the network device 10 has been manufactured. For example, one of the native hardware parsers 42 may be configured to parse a MAC header, another one of the native hardware parsers 42 may be configured to parse a Multi-Protocol Label Switching (MPLS) header, while another one of the native hardware parsers 42 may be configured to parse a User Datagram Protocol (UDP) header. The native hardware parsers 42 may be connected together in a fixed order as shown in FIG. 2 so that when one of the native hardware parsers 42 finishes parsing part of a header section (e.g., one of the headers), the header section is passed to the next native hardware parser 42 in line via one of connections 46. Additionally, or alternatively, each of the native hardware parsers 42 may be connected via connections 44 to one or more (typically to each) of the flexible hardware parsers 40. For example, after one of the native hardware parsers 42 finishes parsing part of a header section (e.g., one of the headers), the header section is passed to one of the flexible hardware parsers 40 via one of the connections 44. The flexible hardware parsers 40 are also connected to each other via the connections 44 so that when one of the flexible hardware parsers 40 finishes parsing part of a header section (e.g., one of the headers), the header section is passed to another one of the flexible hardware parsers 40 via one of the connections 44. The connections 44 between the hardware parsers 40, 42 (i.e., which parser 40, 42 is to receive the header section for processing next) may be configured using the data in the parser configuration registers 24. For example, an identification of the connection 44 used to send the header section to the next parser 40, 42 may be included in the data stored in the parser configuration registers 24. For a given configuration of the hardware parsers 40, 42 some of the connections 44 may be enabled while others are disabled. The configuration of the connections 44 is described in more detail with reference to FIGS. 3-5.

The order of passing the header section between the hardware parsers 40, 42 is determined by the order of the headers in the header section. For example, if the header section includes, a MAC header, followed by an Internet Protocol (IP) header, following by a UDP header, followed by a Virtual Extensible Local Area Network (VXLAN) header, the hardware parsers 40, 42 and their connections 44 are configured to parse the MAC header, followed by the IP header, followed by the UDP header, followed by the VXLAN header. In some embodiments, the header section may include more than one of a particular header protocol. For example, when tunneling is employed, there may be two MAC headers. In such a case, both MAC headers may be parsed using the same flexible hardware parser 40 or native hardware parser 42 at different times in the parsing process. Alternatively, the MAC headers may each be parsed by different ones of the hardware parsers 40, 42.

Figure 3:
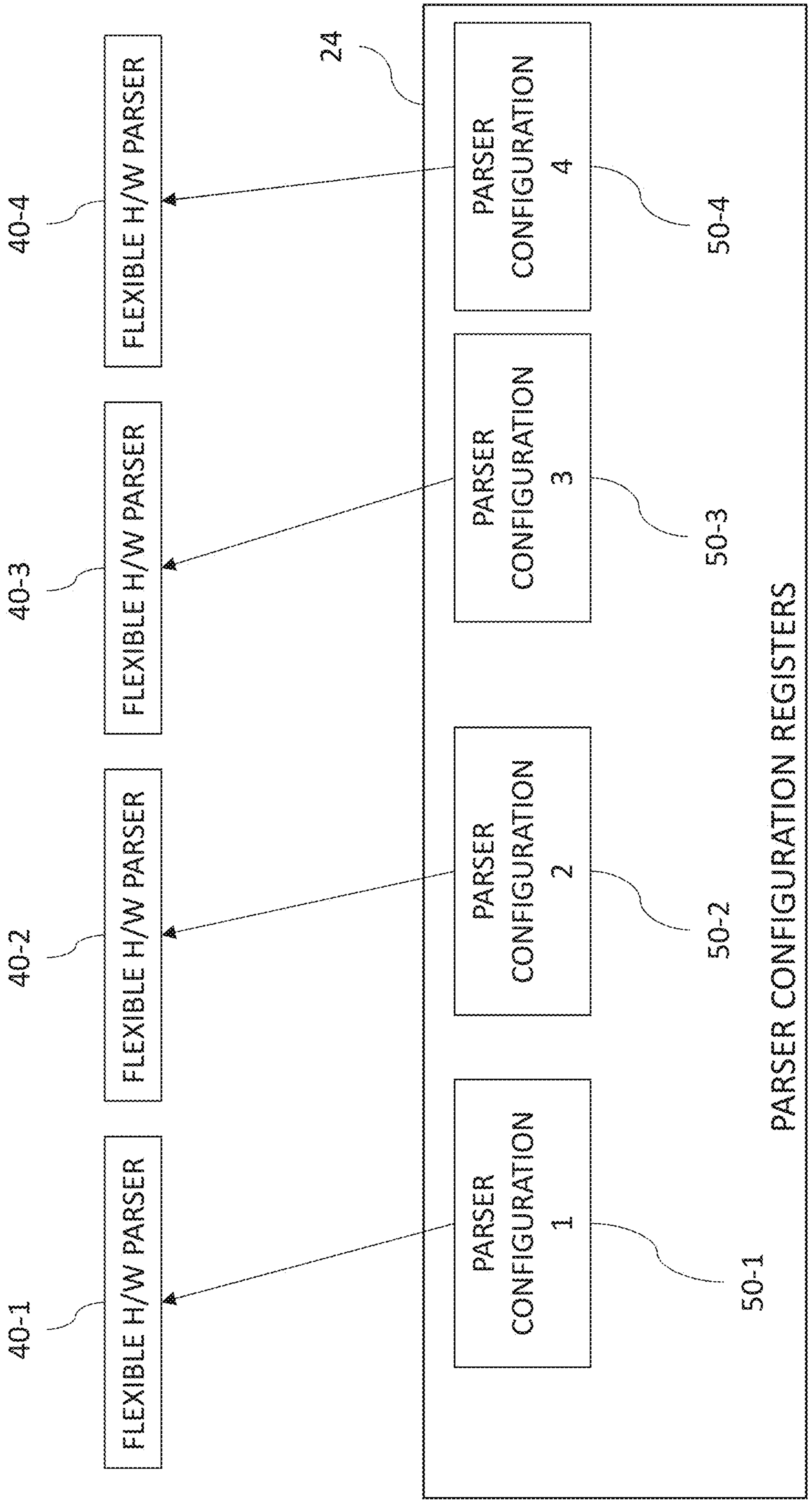
FIG. 3 is a block diagram view of hardware parsers accessing data from a parser configuration data set in accordance with an embodiment of the present invention.

Reference is now made to FIG. 3, which is a block diagram view of flexible hardware parsers 40 accessing data from corresponding parser configurations 50 in accordance with an embodiment of the present invention. FIG. 3 shows different parser configuration 50 loaded into the parser configuration registers 24. As previously mentioned, the parser configurations 50 are generally loaded one-by-one on demand, as described in more detail with reference to FIG. 6. Respective ones of the parser configurations 50 are used to configure respective ones of the flexible hardware parsers 40. For example, the flexible hardware parser 40-1 is configured according to the data in parser configuration 50-1, the flexible hardware parser 40-2 is configured according to the data in parser configuration 50-2, the flexible hardware parser 40-3 is configured according to the data in parser configuration 50-3, and the flexible hardware parser 40-4 is configured according to the data in parser configuration 50-4.

Figure 4:
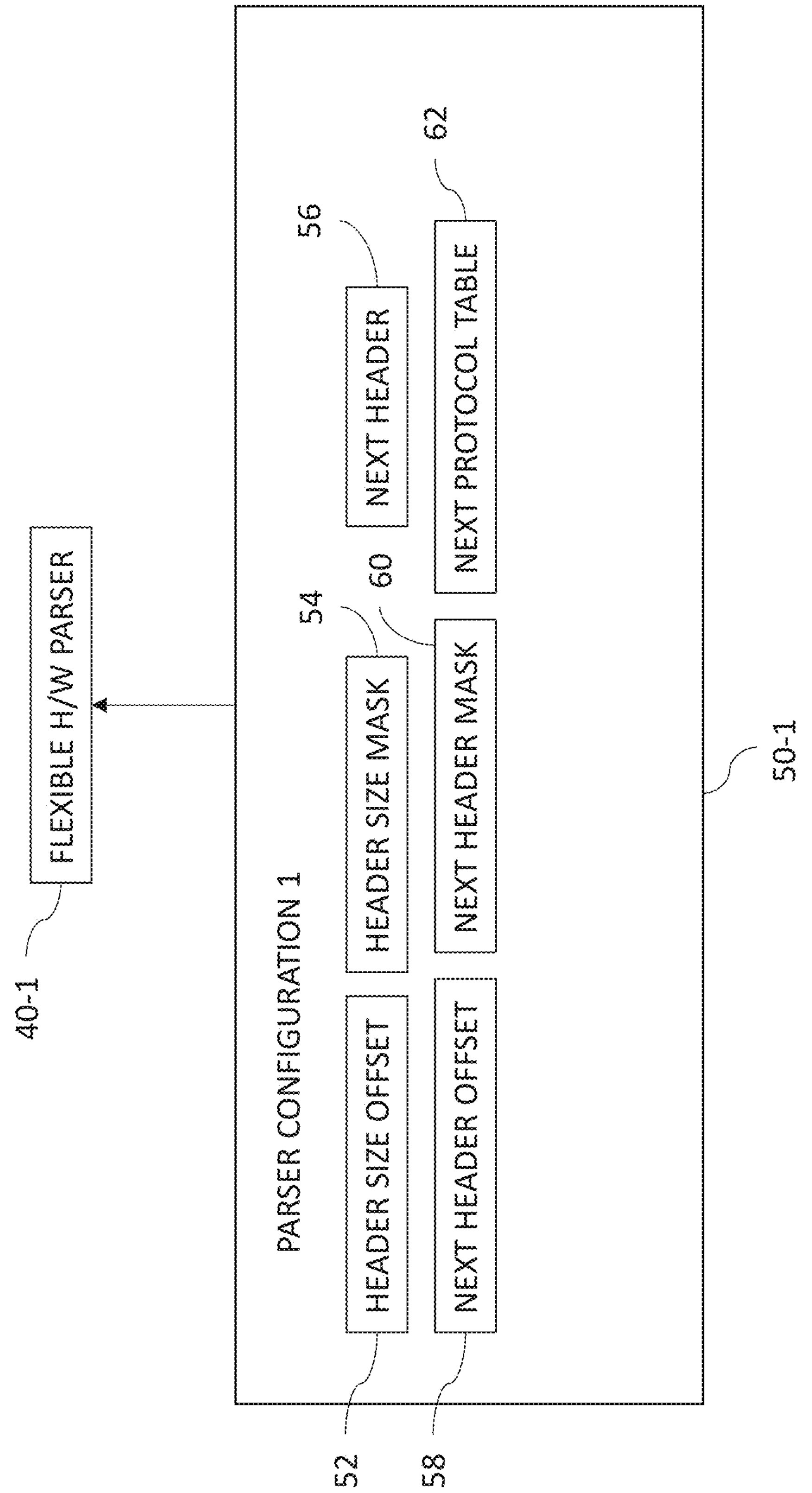
FIG. 4 is a block diagram view illustrating fields in the parser configuration data set of FIG. 3 in accordance with an embodiment of the present invention.
Figure 8:
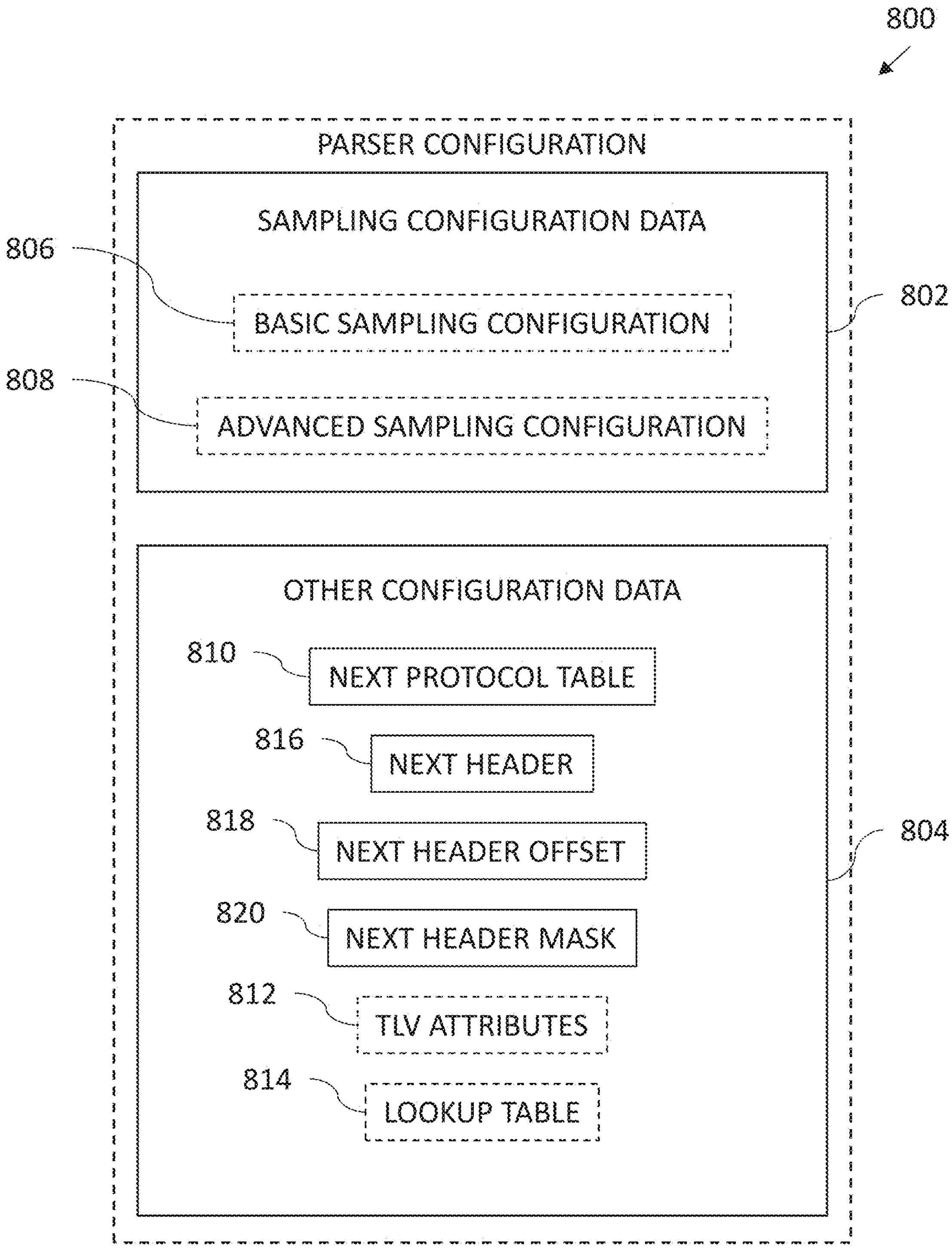
FIG. 8 is a view of a parser configuration for use with the method of FIG. 6.

Reference is now made to FIG. 4, which is a block diagram view illustrating fields in parser configuration 50-1 of FIG. 3 in accordance with an embodiment of the present invention. FIG. 8 describes a different example parser configuration.

The parser configuration 50-1 may include a header size field (not shown) which gives the size of the headers that the flexible hardware parser 40-1 is configured to parse. This field may be useful when the headers parsed by the flexible hardware parser 40-1 are all the same length. Alternatively, parser configuration 50-1 may include a header size offset field 52, which provides the offset of a "header size field" in the header, which the flexible hardware parser 40-1 is configured to parse. The "header size field" in the header gives the size of the header. The header size offset is not the absolute offset with respect to the beginning of the header section, but the relative offset from the beginning of the current header being parsed. The parser configuration 50-1 may optionally include a header size mask field 54 giving the number of bits included in the header size field in the header.

The parser configuration 50-1 may include a next header field 56 which gives an identification of the next header to be parsed in the header section. This field may be useful when there is only one option for the next header from the current one. Alternatively, the parser configuration 50-1 may include a next header offset field 58 and a next header mask field 60. The next header offset field 58 provides the relative offset of a next header identification field in the header giving the identification of the next header to be parsed in the header section. The parser configuration 50-1 may also include a next protocol table 62, which maps next header identifications with protocols. The protocol value found in the next protocol table 62 may provide the identification of one of the connections 44 (FIG. 2) connecting the current flexible hardware parser 40 with another hardware parser 40, 42. The "next header" fields are described in more detail with reference to FIG. 5. The next header mask field 60 provides the number of bits included in the next header identification field in the header.

If the parser configuration 50 used by one of the flexible hardware parsers 40 does not include next header information or the header does not include next header information, parsing is stopped (and the header section is not passed to another hardware parser 40, 42) and further processing of the packet is passed to the packet processing engine 20 (FIG. 1).

As previously mentioned, parsing performed by native hardware parsers 42 is not configured by any of the parser configurations 50 stored in the parser configuration registers 24. However, in order to enable one of the native hardware parsers 42 to pass the header section to one of the flexible hardware parsers 40, data is provided in a parse graph described in more detail with reference to FIG. 7. Each native hardware parser 42 may include a multiplexer (not shown) which receives the header section and the offset computed by that native hardware parser 42 from that native hardware parser 42 and routes the header section and the offset to the next flexible hardware parser 40 via one of the connections 44. The multiplexer selects the relevant connection 44 as follows. The multiplexer may retrieve a next header identification from the header processed by that native hardware parser 42. The multiplexer searches the parse graph until a match is found providing the identification of one of the connections 44 (FIG. 2) connecting to the relevant flexible hardware parser 40. If the multiplexer cannot find a match to the next header identification in the parse graph, parsing is stopped, and further processing of the packet is passed to the packet processing engine 20 (FIG. 1).

Figure 5:
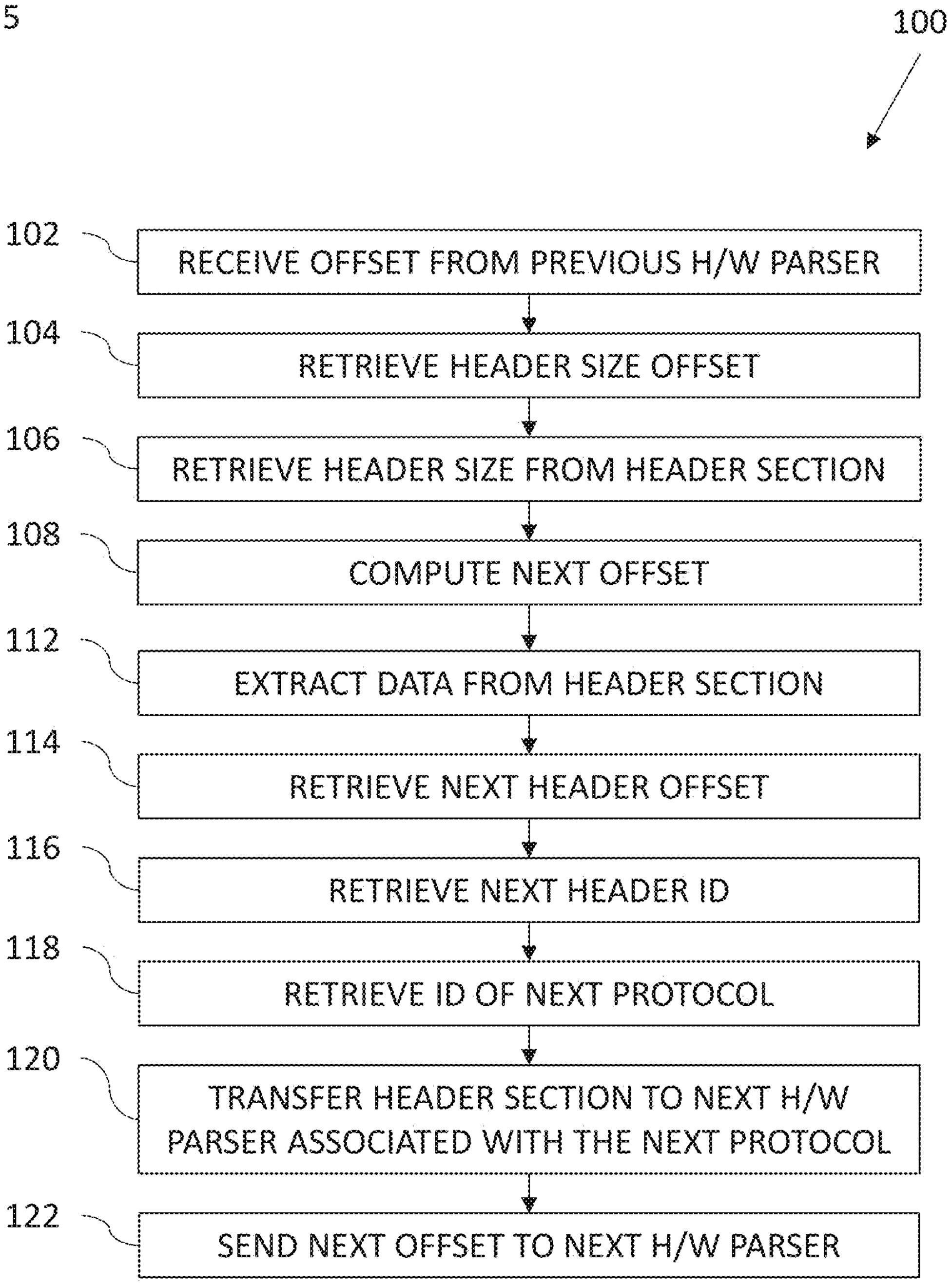
FIG. 5 is a flowchart including steps in a parsing method of the device of FIG. 1.

Reference is now made to FIG. 5, which is a flowchart 100 including steps in a parsing method of the device 10 of FIG. 1. Reference is also made to FIG. 4. The method is described with reference to flexible hardware parser 40-1 for the sake of clarity. However, the method may be applied to any of the flexible hardware parsers 40.

The flexible hardware parser 40-1 is configured to receive (block 102) the absolute offset (from the beginning of the header section) where the previous hardware parser 40, 42 completed parsing from the previous hardware parser 40, 42. If the flexible hardware parser 40-1 is the first parser to parse the header section, the flexible hardware parser 40-1 does not receive any offset and assumes that the offset is zero. The offset is used in the parsing process described below. Therefore, respective ones of the hardware parsers 40, 42 are configured to successively parse the header section according to respective offsets in the header section.

The flexible hardware parser 40-1 is configured to retrieve (block 104) the header size offset from the header size offset field 52 (FIG. 4) and optionally the mask data from the header size mask field 54 (FIG. 4). The flexible hardware parser 40-1 is configured to retrieve (block 106) the header size from the header size (relative) offset in the header. The flexible hardware parser 40-1 is configured to compute (block 108) an offset for passing to the next hardware parser 40, 42 responsively to the retrieved header size and the offset received in the step of block 102. The computed offset provides the offset of the last bit in this header. Therefore, the flexible hardware parser 40-1 is configured to compute the offset responsively to the header size offset field 52 (and optionally header size mask field 54) of the parser configuration data and the header size from the header section, and the offset received in the step of block 102. The computed offset may be saved in the buffer 16 and/or passed on to the packet processing engine 20 in addition to being passed on to the next hardware parser 40, 42.

The flexible hardware parser 40-1 is configured to extract data (block 112) from the header of the header section. The extracted data may be saved in the buffer 16 and/or passed on to the packet processing engine 20.

As mentioned above, the parser configuration 50-1 for the flexible hardware parser 40-1 includes: the next header offset field 58 providing the next header offset of the next header identification (ID) in the header of the header section; and the next protocol table 62 linking next header IDs with next protocols. The flexible hardware parser 40-1 is coupled to retrieve (block 114) the next header offset from the parser configuration 50-1 for the flexible hardware parser 40-1 in the parser configuration registers 24 (FIG. 1). The flexible hardware parser 40-1 is coupled to retrieve (block 116) the next header ID, which is located in the header of the header section at the next header offset, from the header section responsively to the retrieved next header offset. The flexible hardware parser 40-1 is coupled to retrieve (block 118) an identification of a next protocol to be processed from the next protocol table 62 of the parser configuration 50-1 for the flexible hardware parser 40-1 in the parser configuration registers 24 (FIG. 1) responsively to the retrieved next header ID. The flexible hardware parser 40-1 is coupled to transfer (block 120) the header section to one of the hardware parsers 40, 42, which is configured to parse the next header of the header section in accordance with the next protocol. The identification of the next protocol provides the identification of the connection 44 over which the flexible hardware parser 40-1 is connected to the next hardware parser 40, 42. If the parser configuration 50 for the next protocol is not loaded in the parser configuration registers 24, the parser configuration 50 for the next protocol is loaded by the controller 22 into the parser configuration registers 24. The flexible hardware parser 40-1 is coupled to send (block 122) the offset computed in the step of block 108 to the next hardware parser 40, 42. The steps of blocks 102-122 are repeated by the next hardware parser 40, and so on.

Figure 6:
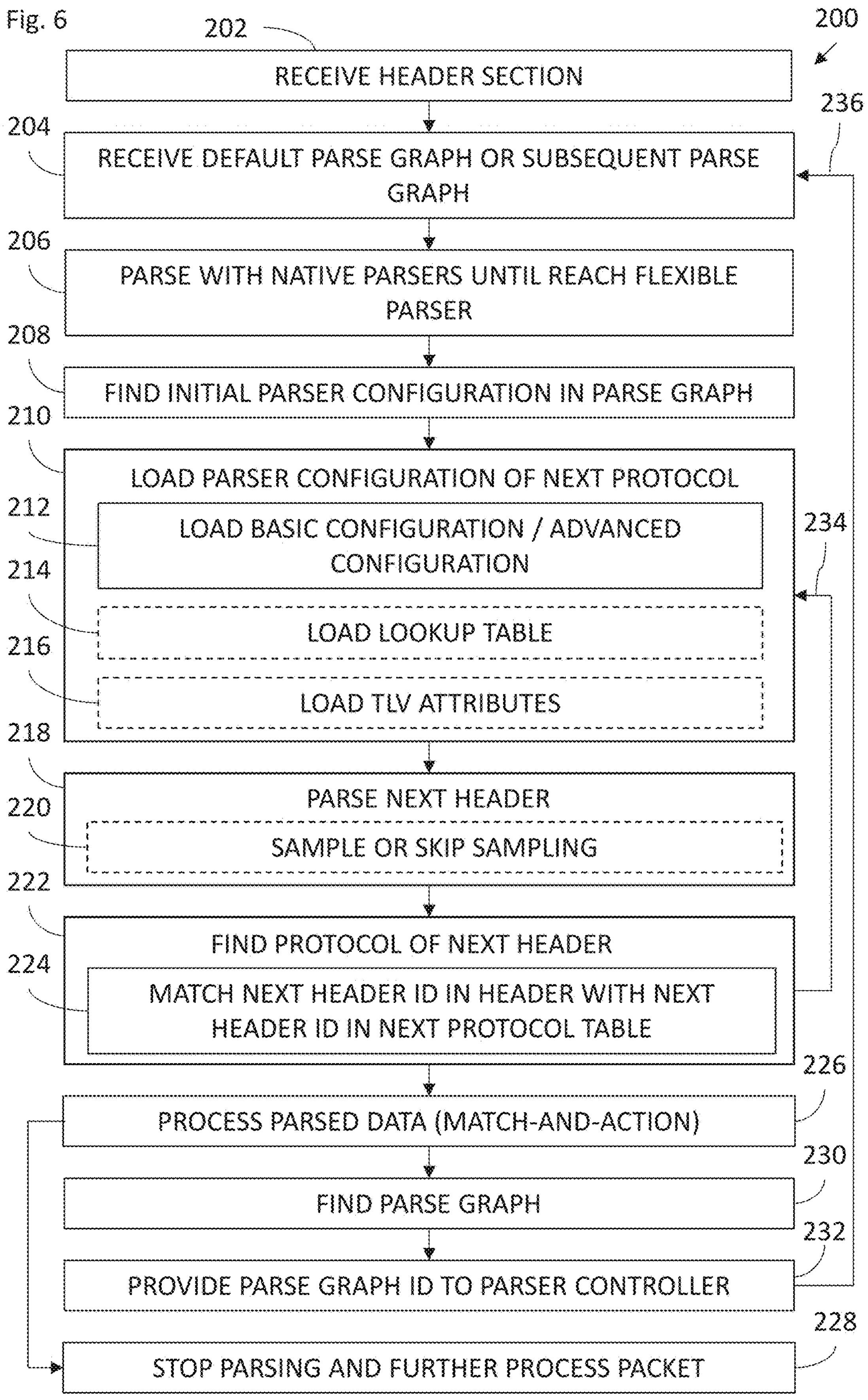
FIG. 6 is a flowchart including steps in a method of operation of the device of FIG. 1.

Reference is now made to FIG. 6, which is a flowchart 200 including steps in a method of operation of the device 10 of FIG. 1. Reference is also made to FIG. 1. The network interface 12 is configured to receive a packet over packet data network 14 and store the packet in the memory 16. The hardware parsers 18 are coupled to receive data of a header section of the packet from the network interface 14 (e.g., via the memory 16) in order to perform an initial parse of the header section (block 202). In particular, the flexible hardware parsers 40 (FIG. 3) are configured to parse the data of the header section based on parser configurations 50 (FIG. 3) loaded into the parser configuration registers 24.

As previously mentioned, and as described in more detail below, the parser configurations 50 are generally loaded on demand, as needed. In particular, the controller 22 is configured to selectively load the parser configurations 50 (FIG. 3) associated with different protocols into the parser configuration registers 24 such that a next parser configuration 50 is loaded into the parser configuration registers 24 based on a next protocol found while parsing a previous header of the header section, as described below in more detail with reference to the steps of blocks 210-224.

An overview of the steps of blocks 210-224 may be illustrated with respect to flexible hardware parser 40-1 and flexible hardware parser 40-2 of FIG. 3. The controller 22 is configured to load parser configuration 50-1 associated with a given protocol into the parser configuration registers 24 for use by flexible hardware parser 40-1. The flexible hardware parser 40-1 is configured to parse a first header of the header section of the received packet according to the loaded parser configuration 50-1 yielding first parsed data, and find a next protocol of a second header of the header section based on the first parsed data. The controller 22 is configured to load parser configuration 50-2 associated with the found next protocol of the second header into the parser configuration registers 24 in response to finding the next protocol of the second header based on the first parsed data. The flexible hardware parser 40-2 is configured to parse the second header according to the loaded parser configuration 50-2 yielding second parsed data, and so on.

Figure 7:
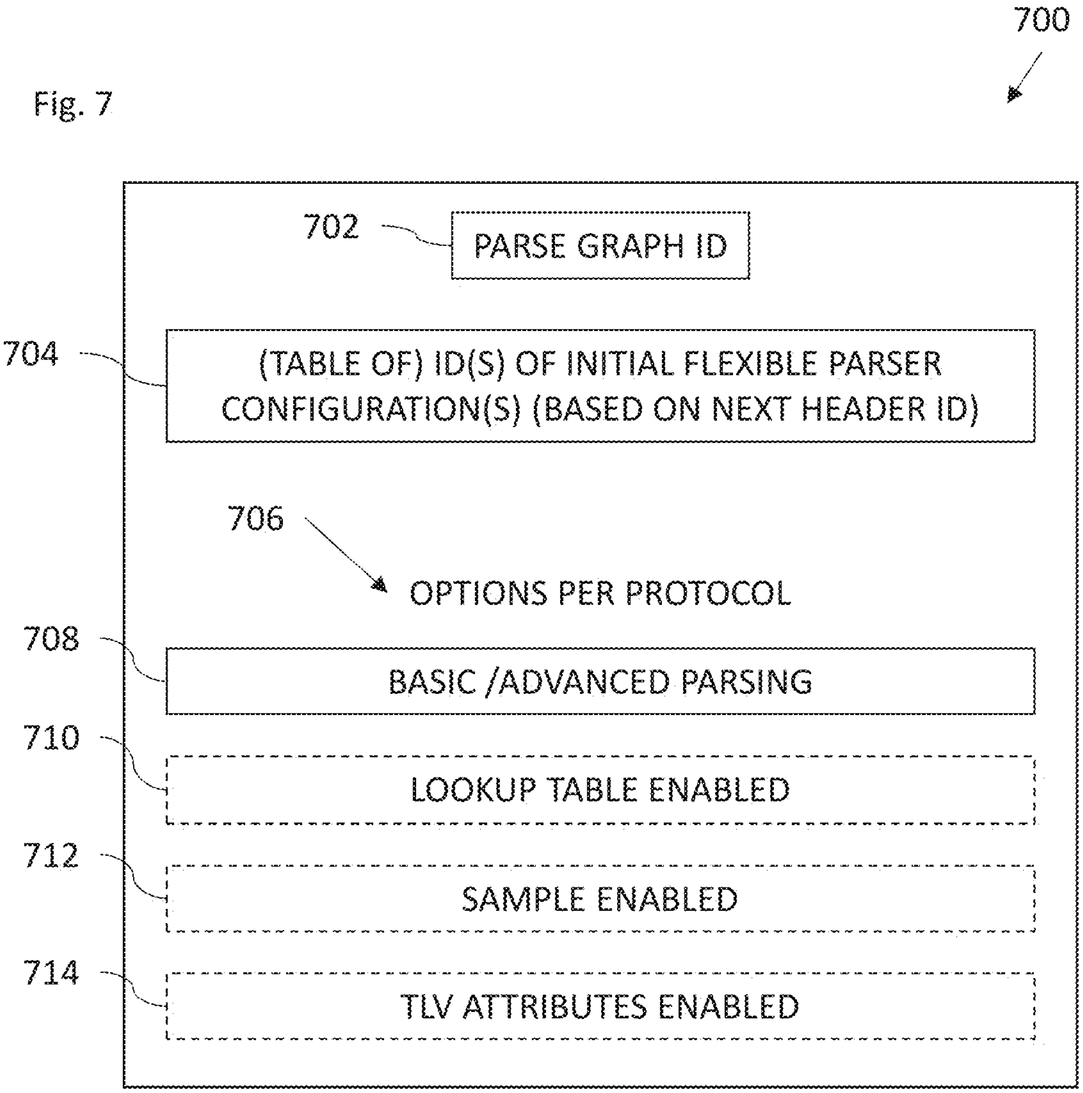
FIG. 7 is a view of a parse graph for use with the method of FIG. 6.

Reference is now made to FIG. 7, which is a parse graph 700 for use with the method of FIG. 6. Reference is also made to FIG. 6.

The controller 22 is configured to receive (and load) a parse graph 700 (e.g., from cache memory 26) (block 204). The cache memory 26 may store multiple parse graph versions. For example, a default parse graph may be used for packet headers being parsed a first time, whereas a more specific parse graph may be used for packet headers being parsed a second or third time, and so on. The parse graph 700 shown in FIG. 7 is an example of a parse graph. The parse graph may take any suitable form to provide the functionality described herein.

Therefore, the controller 22 may be configured to receive a default parse graph corresponding to the initial parse of the header section of the received packet and a different parse graph corresponding to a subsequent parse of the header section. A subsequent parse is performed after the parsed data from the initial parse of the header section is provided to the packet processing engine 20, and the packet processing engine 20 determines that the header section should be reparsed, e.g., using a different parse graph. The parse graph may be identified with an identification. In some embodiments, the packet processing engine 20 determines that the header section should be reparsed and selects the parse graph to be used, and provides the identification of the selected parse graph to the controller 22 to retrieve the selected parse graph from the cache memory 26.

The parse graph 700 may include data such as parse graph identification 702, a table 704 listing the identification of initial flexible hardware parsers 40 (e.g., connections 44 to, or protocols of, the flexible hardware parsers 40) and/or identifications of the parser configurations 50 of the initial flexible hardware parsers 40 after one of the native hardware parsers 42 (described in more detail below). The parse graph 700 provides corresponding configuration options 706 for the different protocols to be applied per protocol such as basic or advanced parsing 708, lookup table enablement 710, sample enablement 712, and TLV attribute enablement 714.

The table 704 may include a list of connections 44 to, and/or other identifications of, initial flexible hardware parsers 40 (or their protocols) and/or the parser configuration 50 to be loaded for the initial flexible hardware parsers 40, and corresponding next header identifications. For example, flexible hardware parser 40-1 may be mapped to next header identification "12", flexible hardware parser 40-2 may be mapped to next header identification "40", flexible hardware parser 40-3 may be mapped to next header identification "29", and flexible hardware parser 40-4 may be mapped to next header identification "05". The use of the of the table 704 is described in more detail below. The table 704 is used for providing the list of connections 44 from native hardware parsers 42 to flexible hardware parsers 40, e.g., from a last native hardware parser 42 to an initial flexible hardware parser 40, as described in more detail below. The connections 44 between the flexible hardware parsers 40 are provided in the parser specific configuration data described in more detail with reference to FIG. 8.

For one or more of the different protocols listed in the parse graph 700, each protocol may include a basic parsing option configuration and an advanced parsing option configuration. The parse graph 700 may include data or flags to indicate whether a basic parsing option configuration or an advanced parsing option configuration 708 should be applied per protocol.

For example, a header section may include the following headers:

MAC|IPv4|UDP| flexible header 1

The packet processing engine 20 may be configured to match on a field in flexible header 1 and perform an action based on the field data. One option is for flexible hardware parser 40-1 to extract all of flexible header 1 and pass the whole header to the packet processing engine 20 to find the desired field in flexible header 1. Another option is for flexible hardware parser 40-1 to take a pointer and perform a computation to find another field in same header for extraction and passing to packet processing engine 20. Another option is for packet processing engine 20 to process the whole header, and instruct the flexible hardware parser 40-1 to reparse flexible header 1 to extract the desired field. To extract the whole header may need more basic parser configuration data than the configuration data needed to extract a specific field in flexible header 1. Therefore, the selection of whether a header of a given protocol should be parsed using a basic or advanced parsing option configuration may depend on the implementation details.

The parse graph 700 may also indicate whether to load a lookup table per protocol (or per protocol for a subset of the different protocols) using the lookup table enablement 710. For example, bits from a field in the header parsed by one of the flexible hardware parsers 40 may be used as a lookup in table to provide a length which indicates where to start the next header from or how much to sample in the current header.

The parse graph 700 may also indicate whether to sample or skip sampling per protocol (or per protocol for a subset of the different protocols) using sample enablement 712. For example, a header may be parsed, and data extracted from that header, or that header may be skipped over without extracting any data from that header. In that header is to be skipped over, then the parser configuration data does not need to list any sampling configuration data, as described in more detail with reference to FIG. 8.

The parse graph 700 may indicate whether to load type-length-value (TLV) attributes per protocol (or per protocol for a subset of the different protocols) using TLV attribute enablement 714.

As previously mentioned, the hardware parsers 18 include native hardware parsers 42 which have fixed parser configurations. The native hardware parsers 42 may be configured to parse the header section until an initial flexible parser 40 is reached (block 206). As mentioned above, the parse graph 700 includes a reference to the initial flexible hardware parser 40, e.g., using the table 704. The multiplexer specific to the last native hardware parser 42 is configured to search the table 704 to find the initial flexible hardware parser 40 (e.g., the connection 44 to, or other identification of, the initial flexible hardware parser 40 or the parser configuration 50 of the initial flexible hardware parser 40) using the next header identification found in the header parsed by the last native hardware parser 42 (block 208). For example, if the next header identification found in the header parsed by the last native hardware parser 42 is equal to "29", the multiplexer searches the next header fields of table 704 and finds that flexible hardware parser 40-3 is mapped to next header identification "29". The controller 22 is configured to load the parser configuration 50 (e.g., parser configuration 50-3) of the initial flexible parser 40 (e.g., flexible hardware parser 40-3) into the parser configuration registers 24 and the multiplexer is configured to pass the header section to the initial flexible hardware parser 40 (e.g., flexible hardware parser 40-3) based on the reference (e.g., in the table 704) in the parse graph 700 (block 210).

Reference is now made to FIG. 8, which is a parser configuration 800 for use with the method of FIG. 6. Reference is also made to FIG. 6. The parser configuration 800 is an alternative example of a parser configuration which may be used instead of parser configuration 50.

At the step of block 210, the controller 22 is configured to load parser configuration 800 or part thereof, as described in more detail below. The step of block 210 is performed for the initial flexible hardware parser 40, and for subsequent flexible hardware parsers 40 with different parser configurations 800 being loaded according to the protocol of the header of the header section being parsed.

The parser configuration 800 may include sampling configuration data 802 and other configuration data 804. The sampling configuration data 802 includes information indicating how to parse a given header according to a given protocol (e.g., for the packet processing engine 20 to match on using the match and action tables 28) and may include a basic sampling configuration 806 or an advanced sampling configuration 808. The advanced sampling configuration 808 may include any suitable sampling instructions indicating how a header should be sampled. It may include one or more of suitable fields of the parser configuration 50-1 shown in FIG. 4. The basic sampling configuration 806 includes less sampling instructions than the advanced sampling configuration 808.

The controller 22 may load the basic sampling configuration 806 or the advanced sampling configuration 808 based on the indication of basic or advanced parsing 708 included in the loaded parse graph 700 for the protocol of the current header being parsed (block 212) and assuming that the sample enablement 712 indicates that the header should be parsed and not skipped over. The controller 22 may not load the sampling configuration data 802 (i.e., not the basic sampling configuration 806 and not the advanced sampling configuration 808) based on the sample enablement 712 indicating that the header should be skipped over.

The other configuration data 804 may include information to find the next protocol such as a next protocol table 810 providing a mapping between next header identifications and next protocols, and a next header 816 or a next header offset 818 and a next header mask 820, described in more detail below with reference to the step of blocks 222 and 224. The data included in the parser configuration 800 is generally protocol specific.

The other configuration data 804 may optionally include TLV attributes 812, and a lookup table 814. The controller 22 is configured to load the next protocol table 810 into the parser configuration registers 24 as part of the parser configuration 800. The controller 22 may load the lookup table 814 (block 214) and/or TLV attributes 812 (block 216) into the parser configuration registers 24 as part of the parser configuration 800 based on lookup table enablement 710 and the TLV attribute enablement 714, respectively, in the loaded parse graph 700.

It can be seen that for some headers the whole parser configuration 800 is loaded whereas for other headers only part of that parser configuration 800 is loaded into the parser configuration registers 24. Also, for the same protocol different packets may be treated differently. Therefore, the controller may be configured to selectively load a parser configuration 800 into the parser configuration registers 24 for a first packet, and only part of the same parser configuration 800 into the parser configuration registers for a second packet.

The current flexible hardware parser 40 (e.g., flexible hardware parser 40-1) is configured to parse the next header of the header section based on the parser configuration 800 loaded into the parser configuration registers 24 for the current flexible hardware parser 40 (block 218). The current flexible hardware parser 40 is configured to sample or skip sampling of the next header according to the parser configuration 800 which may or may not include the sampling configuration data 802 based on the sample enablement 712 in the parse graph 700 (block 220).

The current flexible hardware parser 40 is configured to find the next header protocol and other data to find the next header (i.e., the header after the current header which was just parsed) in the header section of the packet (block 222), as described in more detail below.

In some cases, the other configuration data 804 may include the next header field 816 provides an identification of the next header to be parsed in the header section. This field may be useful when there is only one option for the next header from the current one. Alternatively, the other configuration data 804 may include the next header offset field 818 and the next header mask field 820. The next header offset field 818 provides the relative offset of a next header identification field in the current header giving the identification of the next header to be parsed in the header section.

The next header mask field 820 provides the number of bits included in the next header identification field in the header. The other configuration data 804 may also include data indicating how to skip the current header (e.g., length of the current header).

The next protocol table 810 maps next header identifications with protocols. The protocol value found in the next protocol table 810 may provide the identification of one of the connections 44 (FIG. 2) connecting the current flexible hardware parser 40 with another hardware parser 40, 42. For example, flexible hardware parser 40-1 may be mapped to next header identification "20", flexible hardware parser 40-2 may be mapped to next header identification "12", flexible hardware parser 40-3 may be mapped to next header identification "06", and flexible hardware parser 40-4 may be mapped to next header identification "32".

The current flexible hardware parser 40 is configured to find the next header protocol of the next header in the header section by matching a next header identification included in the current header with one of the next header identifications included in the next protocol table 810 (block 224). The step of block 210 is repeated (arrow 234) to load the parser configuration 800 associated with the found next header protocol. The steps of blocks 212 to 224 may also be repeated.

For example, if the next header identification found in the header parsed by the current flexible hardware parsers 40 is equal to "12", the current flexible hardware parsers 40 searches the next header identifications of next protocol table 810 and finds that flexible hardware parser 40-2 is mapped to next header identification "12". The controller 22 is configured to load the parser configuration 800 of the initial flexible parser 40 (e.g., flexible hardware parser 40-3) into the parser configuration registers 24 and the current flexible hardware parser 40 (e.g., flexible hardware parsers 40-1) is configured to pass the header section to the next flexible hardware parser 40 (e.g., flexible hardware parser 40-2) based on the protocol reference found in the next protocol table 810.

The steps of blocks 221-224 may be repeated until there are no more headers in the header section to parse or when the next header identification is missing or equal to a given value (e.g., which specifies a connection from the hardware parsers 18 to the packet processing engine 20).

Based on the above description, it is seen that in at least some cases, the controller 22 is configured to selectively load only some of the parser configurations of the different protocols listed in the parse graph 700 into the parser configuration registers 24 in order for the hardware parsers 18 to parse the (whole) header section of the packet.

After the header section has been parsed (for example, after the initial parse of the header section or after a subsequent parse of the header section, the packet processing engine 20 is configured to: receive the parsed data (of the initial parse or of a subsequent parse) of the header section; and process the parsed data (e.g., using the match and action tables 28) (block 226). The packet processing engine 20 may determine that the parsing process should be stopped, and that the packet should proceed to further processing in the packet processing pipeline (block 228). The packet processing engine 20 may determine that the header section or part thereof should be reparsed and the packet processing engine 20 is configured to find a new parse graph 700 based on the received parsed data (block 230); and provide the identification of the new parse graph 700 to the controller 22 (block 232). The method then continues (arrow 236) with the step of block 204, in which the controller 22 is configured to receive (and/or load) the new parse graph based on the identification provided by the packet processing engine 20. The subsequent steps of flowchart 200 are performed according to the description provided above.

FIGS. 9-15 describe steering engine 21 generating or computing parsing information for use by parser engine 17. The methods described with reference to FIGS. 9-15 may be implemented using networking device 10 described above with reference to FIGS. 1-8 in which configuration data is loaded into the flexible hardware parsers 40 on demand (as needed) while using one or more parse graphs, or a configuration data set may be loaded into the parser configuration registers 24 at the beginning of each parsing round with or without using a parse graph. In other embodiments, the methods described with reference to FIGS. 9-15 may be implemented using a networking device which operates differently to that described above, but allows the parser engine to be dynamically configured to parse different headers in a dynamic manner as required by the methods described with reference to FIGS. 9-15.

Figure 9:
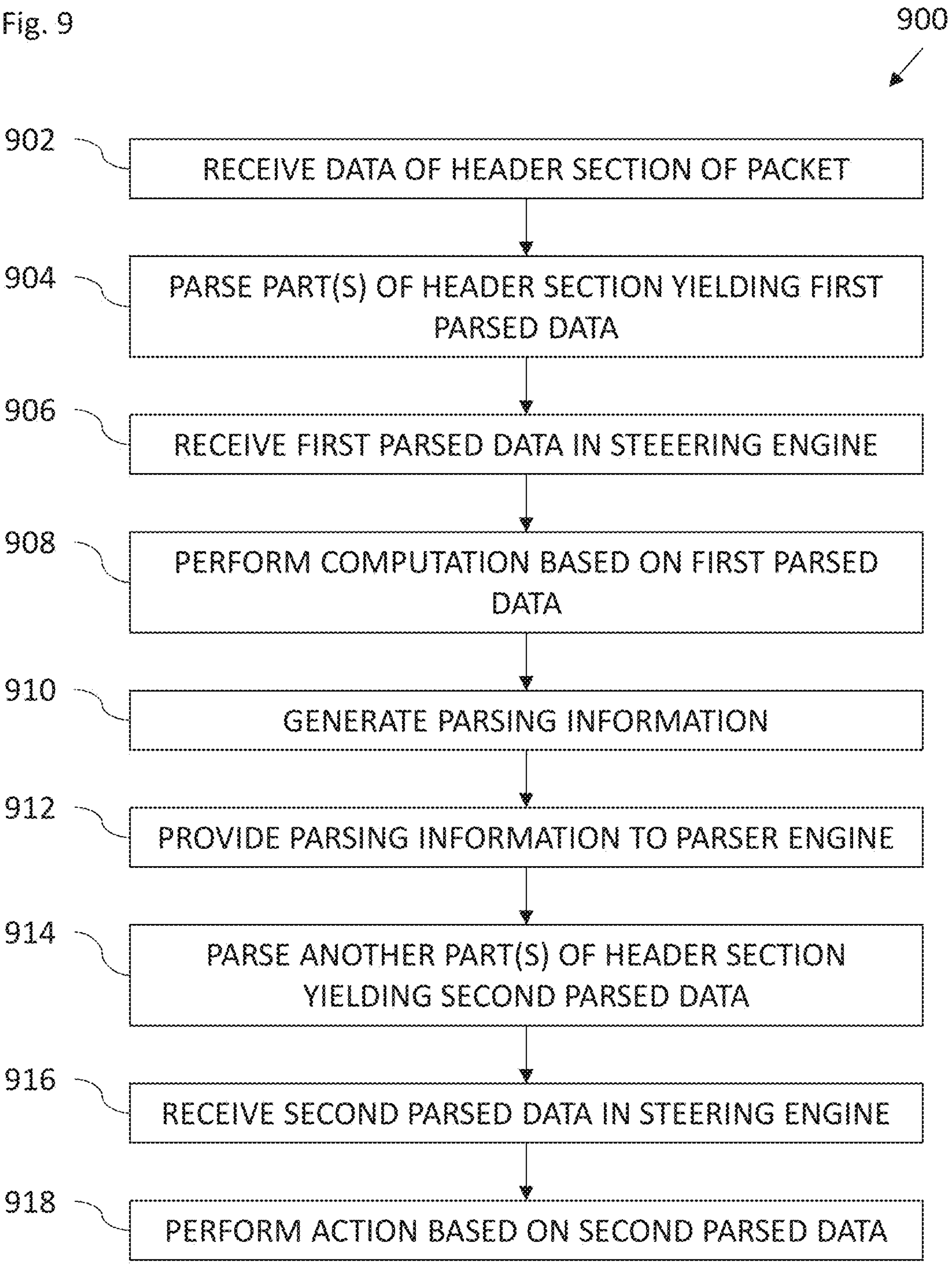
FIG. 9 is a flowchart including steps in a method including steering computation in the device of FIG. 1.

Reference is now made to FIG. 9, which is a flowchart 900 including steps in a method including steering computation in the device 10 of FIG. 1.

The network interface 12 is configured to receive packets over the packet data network 14. The parser engine 17 is configured to receive data of a header section of a packet (block 902). The parser engine 17 is configured to parse at least one first part (e.g., one or more headers of the header section, or part(s) thereof) of the header section yielding first parsed data (block 904).

The steering engine 21 is configured to receive the first parsed data (block 906). In some embodiments, the steering engine 21 is configured to perform a computation based on the first parsed data (block 908). The computation may be performed based on an instruction (e.g., a function) indicated by an action in the match and action tables 28 which provide a match based on the first parsed data (or part thereof). Different computational examples are described below with reference to FIGS. 9-15. The steering engine 21 is configured to generate parsing information of how to parse at least one second part of the header section (block 910). In some embodiments, the steering engine 21 is configured to generate the parsing information based on a result or results of the computation(s).

The parsing information may include an indication of a protocol of a given header to parse (e.g., a name of the protocol or the connection 44 (FIG. 2) to the flexible hardware parser 40 or native hardware parser 42 to parse the next header of that protocol). The indication could include the length of the header of that protocol. In some embodiments, the parsing information may include an indication of a location in the header section of a given header to parse and an indication of a protocol of the given header, e.g., in order for the parser engine 17 to parse the given header. In some embodiments, the parsing information may include an indication of a location in the header section of a given field to parse, and a length of the given field, e.g., in order for the parser engine 17 to parse the given field. In some embodiments, the parsing information may include an indication of a first header of the header section, an offset in the header section from the first header to a second header to parse, and an indication of a protocol of the second header, e.g., in order for the parser engine 17 to parse the second header.

The steering engine 21 is configured to provide the parsing information to the parser engine 17 (block 912). The parsing information may be processed by the parser engine 17 or the controller 22 to configure the parser engine 17 to parse the second part(s) of the header section, for example, by updating the parser configuration registers 24. In some embodiments, the steering engine 21 may write the parsing information directly to the parser configuration registers 24 in order to configure the parser engine 17 to parse the second part(s) of the header section based on the parsing information. The parser information may include a parse graph ID to use to reparse the header section.

The parser engine 17 is configured to parse the second part(s) (e.g., one or more headers of the header section, or part(s) thereof) of the header section based on the parsing information yielding second parsed data (block 914). The second part(s) may be the same as the first part(s) of the header section or may be different from the first part(s) of the header section. The second part(s) may be partially the same as the first part(s) of the header section.

The steering engine is configured to receive the second parsed data (block 916) and to perform an action based on the second parsed data (block 918). The action may include forwarding the packet, or performing another computation and/or generating additional parsing information for another round of parsing by the parser engine 17, and so on.

The method of FIG. 9 may be applied in the case of dynamic port allocation. There are certain protocols that the parser engine 17 does not know how to parse in advance. For example, a user datagram protocol (UDP) port may be dynamically allocated and there is no field in the UDP header indicating the next protocol with which to program the parser engine 17 to parse. Other examples are Real-time Transport Protocol (RTP), PSP Security Protocol (PSP), RDMA over Converged Ethernet (ROCE), Datagram Transport Layer Security (DTLS), and Quick UDP Internet Connections (QUIC). Therefore, in the UDP example, the parser engine 17 parses the MAC, IP and UDP headers yielding first parsed data, but the parser engine 17 does not know what the UDP port number means with respect to further parsing of an unknown header after the UDP header. The steering engine 21 receives the first parsed data and performs a 5-tuple lookup to determine the protocol of the unknown header. The steering engine 21 sends the parsing information to the parser engine 17 identifying the unknown header. If the unknown header is DTLS (for example), the parsing information may include the following:

Start header—DTLS
Relative header—UDP
Offset—8.

The above parsing information may instruct the parser engine 17 that once the UDP header is found, jump 8 bytes to reach the DTLS header and parse the DTLS header.

The parser engine 17 may be custom configured (e.g., on the fly in runtime) based on the parsing information (which is based on computations of the steering engine 21). For example, the parsing information may inform the parser engine 17 which headers to skip over to get to the next header and the protocol of the next header, or provide the connection 44 (FIG. 2) to the flexible hardware parser 40 or native hardware parser 42 to parse the next header.

Figure 10:
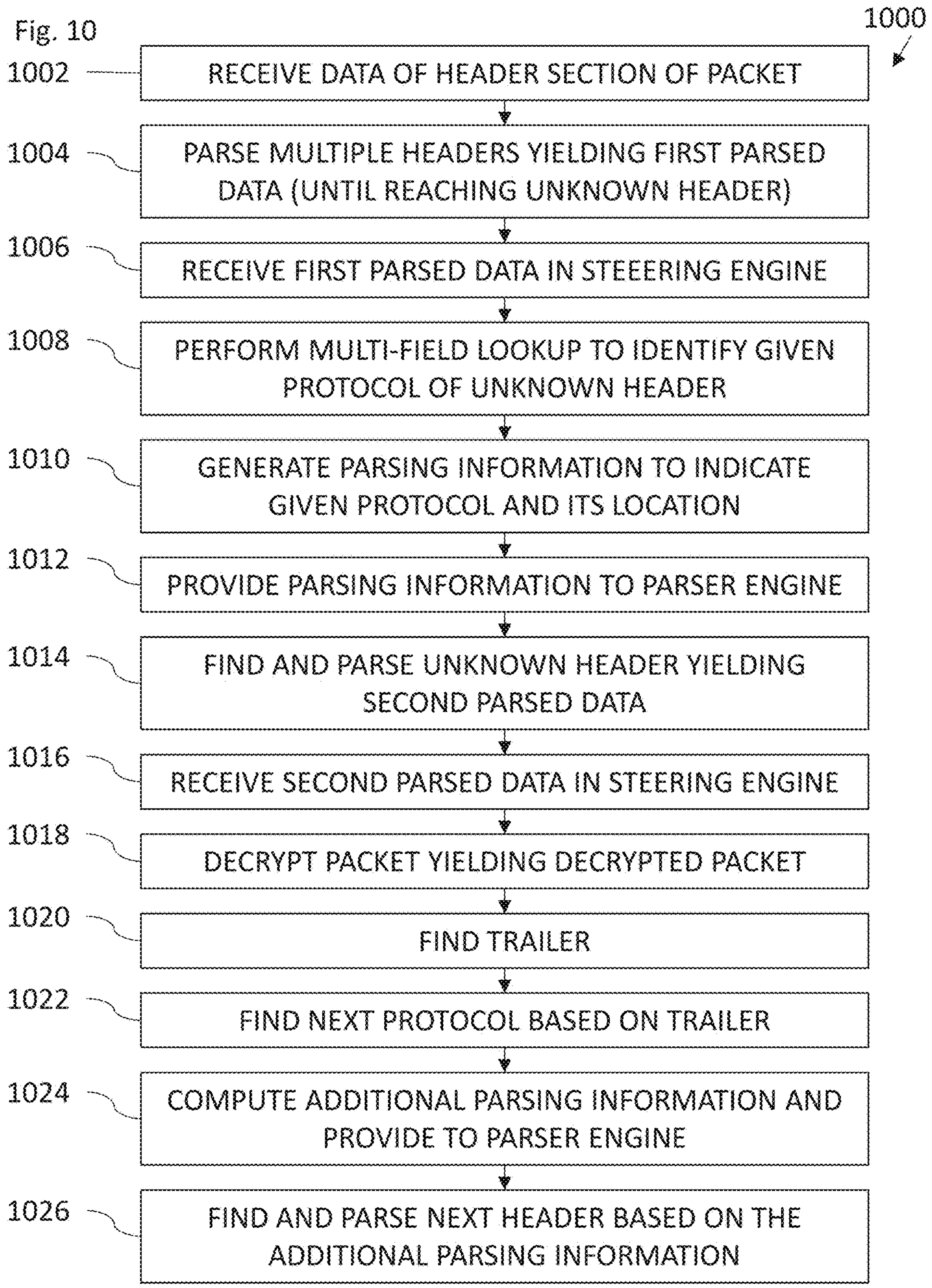
FIG. 10 is a flowchart including steps in a method to compute parsing information based on a trailer.
Figure 11:
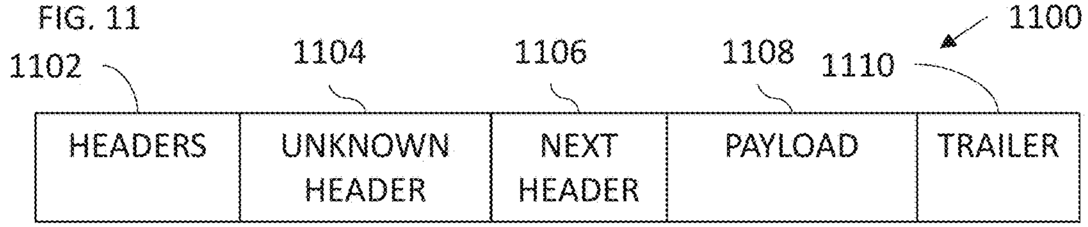
FIG. 11 is a schematic view of a packet to illustrate the method of FIG. 10.

Reference is now made to FIGS. 10 and 11. FIG. 10 is a flowchart 1000 including steps in a method to compute parsing information based on a trailer 1110. FIG. 11 is a schematic view of a packet 1100 to illustrate the method of FIG. 10.

The packet 1100 may include one or more headers 1102, followed by an unknown header 1104 and then a next header 1106, and then a payload 1108 followed by trailer 1110. For example, the unknown header 1104 may be DTLS (which may first need to be identified) there may be another protocol (e.g., next header 1106) running over DTLS e.g., ROCE. The header section does not identify the other protocol (e.g., ROCE) running. A trailer (at end of packet after payload) provides the identity of the other protocol running. The packet first needs to be decrypted (based on the DTLS header) to reveal the trailer. The steering engine 21 extracts one or more trailer fields and performs a lookup of the trailer field(s) in a table (e.g., hash table) to identify the next header 1106 after the DTLS header, as described in more detail below.

The parser engine 17 is configured to receive header section data of a packet (block 1002). The parser engine 17 is configured to parse multiple headers (1102) of the header section yielding first parsed data until reaching an unknown header 1104 (block 1004). The steering engine 21 is configured to receive the first parsed data (block 1006). The steering engine 21 is configured to perform a multi-field lookup (e.g., a 5-tuple lookup in a hash table) based on the first parsed data to identify the unknown header 1104 as a header of a given protocol (block 1008). The given protocol of the unknown header 1104 may be a security protocol (e.g., DTLS). The steering engine 21 is configured to generate parsing information to include an indication of the given protocol and an indication of a location of the unknown header 1104 in the header section of the packet (block 1010). The steering engine 21 is configured to provide the parsing information to the parser engine 17 (block 1012). The location may include an offset from the beginning of the header section or a relative offset with respect to one of the headers, e.g., the last of the headers 1102.

The parser engine 17 is configured to find the unknown header 1104 based on the indication of the location in the parsing information, and parse the unknown header 1104 according to the given protocol based on the indication of the given protocol included in the parsing information yielding the second parsed data (block 1014). The steering engine 21 is configured to receive the second parsed data (e.g., including details of the DTLS header) (block 1016) and decrypt the packet based on the second parsed data and the security protocol (e.g., DTLS) yielding a decrypted packet (block 1018). The steering engine 21 is configured to find the trailer 1110 of the decrypted packet (block 1020) and find a next protocol of the next header 1106 of the header section based on the found trailer 1110 (block 1022), e.g., by performing a lookup of one or more trailer fields in a table. The next protocol may be any suitable protocol, for example, ROCE.

The steering engine 21 is configured to compute additional parsing information including an indication of a location of the next header 1106 and an indication of the next protocol of the next header 1106 based on the found trailer 1110, and provide the additional parsing information to the parser engine 17 (block 1024). The parser engine 17 is configured to find the next header 1106 based on the indication of the location in the additional parsing information, and parse the next header 1106 according to the next protocol based on the indication of the next protocol included in the additional parsing information yielding third parsed data (block 1026). The third parsed data is then received by the steering engine 21 and processed to yield an action such as forwarding the packet to a destination or sending the header for reparsing by the parser engine 17, and so on.

The method of FIG. 10 may be performed in any suitable order and with any suitable protocols. For example, the method of FIG. 10 may include the steps of blocks 1002-1008 and the steps of blocks 1018-1026.

Figure 12:
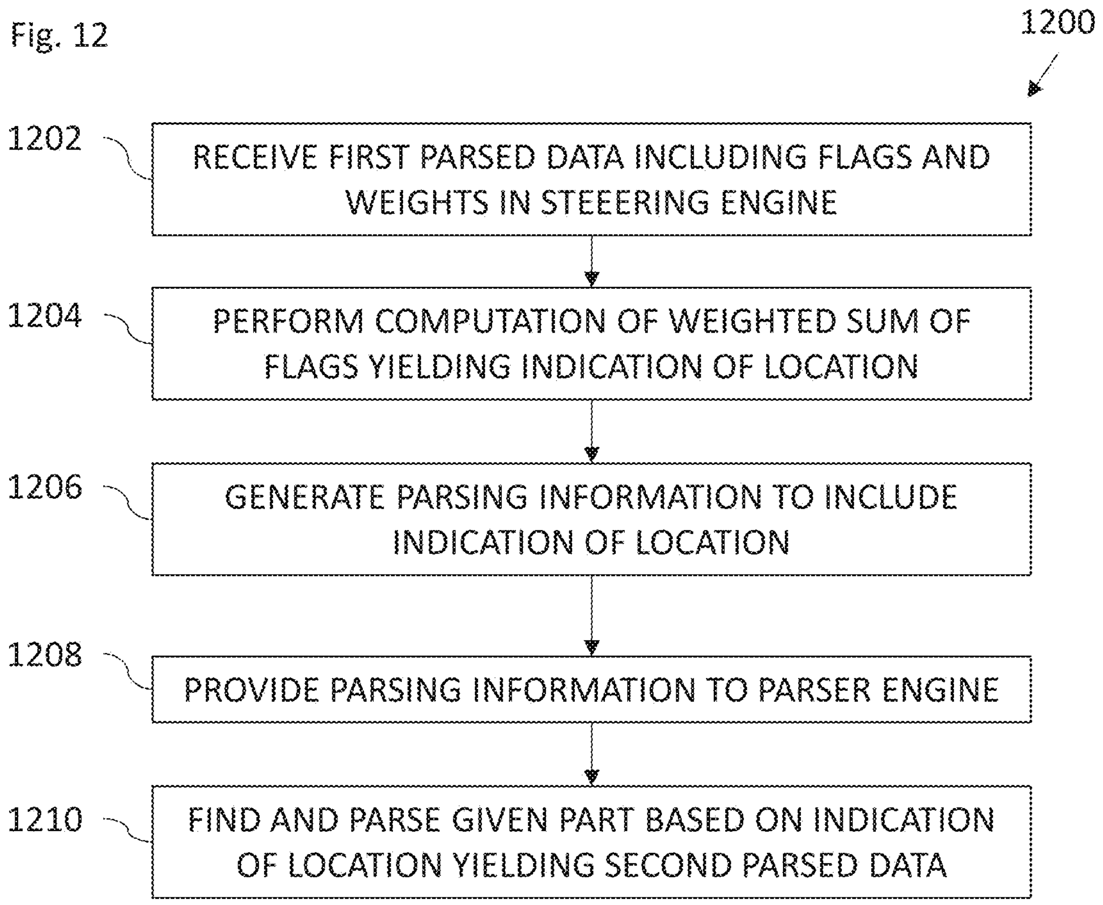
FIG. 12 is a flowchart including steps in a method to compute parsing information based on flags.
Figure 13:
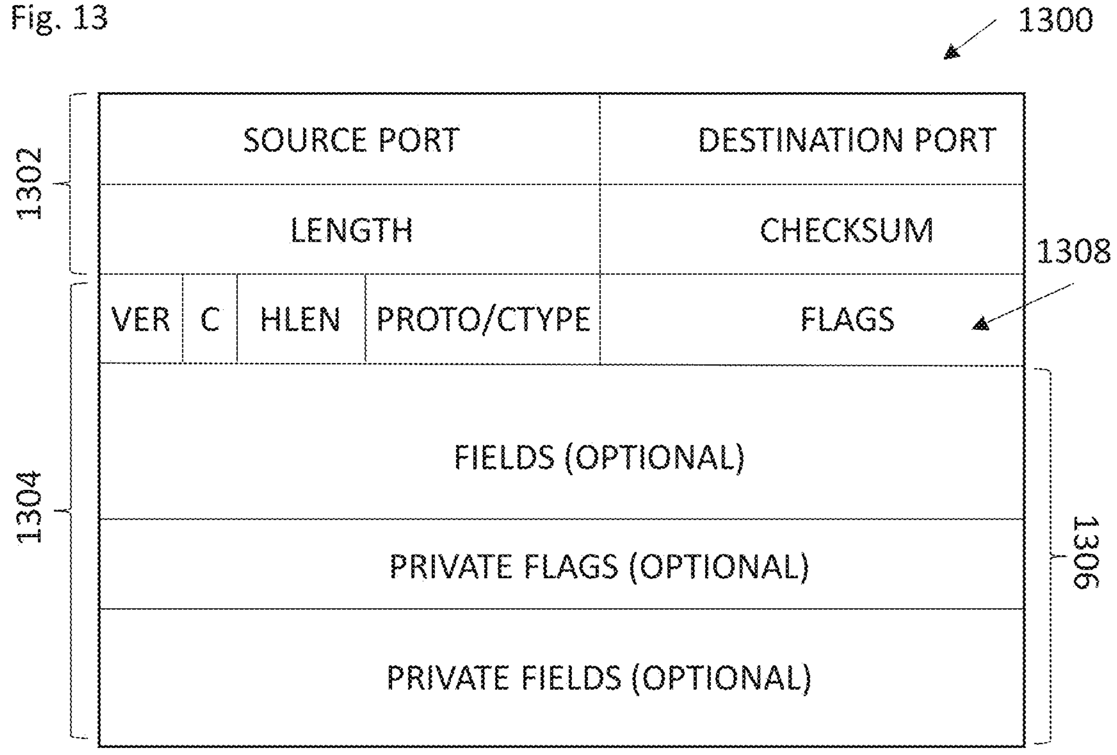
FIG. 13 is a view of a header format for use with the method of FIG. 12.

Reference is now made to FIGS. 12 and 13. FIG. 12, which is a flowchart 1200 including steps in a method to compute parsing information based on flags 1308. FIG. 13 is a view of a header format 1300 for use with the method of FIG. 12.

The header format 1300 shown in FIG. 13 includes a UDP header 1302 (first two lines) with generic UDP encapsulation (GUE) 1304 (after the first two lines). GUE is programmable and may be complex. Type-length-value (TLV) headers may be inserted into optional fields 1306 and use flags 1308 to indicate that given TLV headers exist in the optional fields 1306. In order to access a given TLV header, the steering engine 21 performs a computation using two or more of the flags 1308 and the respective weights of the flags 1308. For example, if it is desired to update TLV3 in packet processing, TLV3 first needs to be found by performing a weighted sum of flags 1 and 2. However, the flags 1308 first need to be found and parsed, as described in more detail below. The steps of blocks 902 and 904 of FIG. 9 may be performed to yield the first parsed data, which includes flags and weights of the flags.

The steering engine 21 is configured to receive the first parsed data including the flags and weights (block 1202) and compute a weighted sum of at least some of the flags 1308 yielding an indication of a location of a given part of the header section (e.g., one of the optional fields 1306) (block 1204). For example, the steering engine 21 may compute the location of TLV3 (e.g., the offset of TLV3 from the start of GUE and the length of TLV3). The steering engine 21 is configured to generate the parsing information to include the indication of the location of the given part (e.g., TLV3) of the header section (block 1206); and provide the parsing information to parser engine 17 (block 1208). The parser engine 17 is configured to find and parse the given part (e.g., TLV3) based on the indication of the location in the parsing information yielding the second parsed data. The second parsed data is then provided to steering engine 21 for further processing, and so on.

Figure 14:
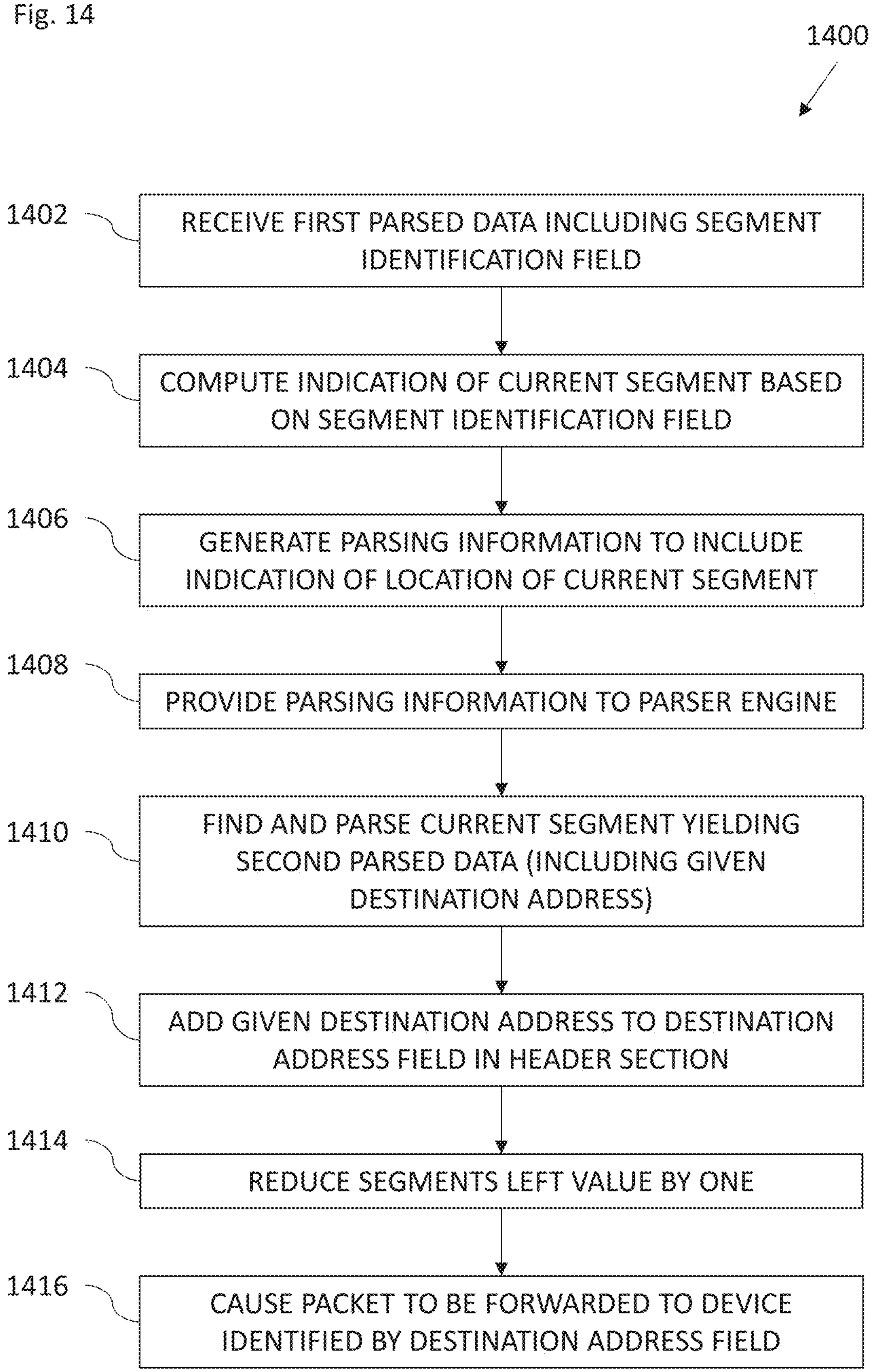
FIG. 14 is a flowchart including steps in a method to compute parsing information based on a segment identification field.
Figure 15:
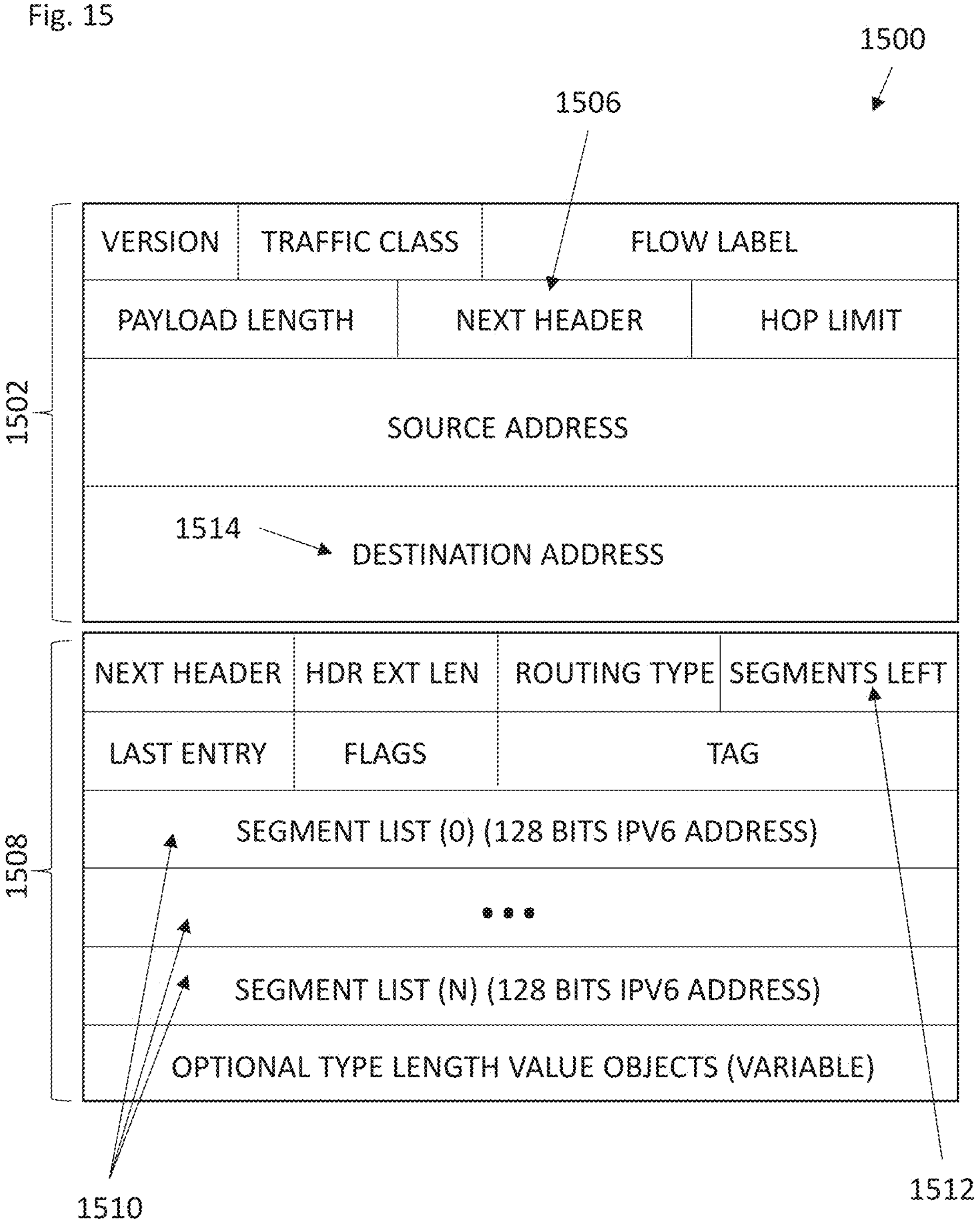
FIG. 15 is a view of header formats for use with the method of FIG. 14.

Reference is now made to FIGS. 14 and 15. FIG. 14 is a flowchart 1400 including steps in a method to compute parsing information based on a segment identification field. FIG. 15 is a view of header formats 1500 for use with the method of FIG. 14.

An IPv6 header 1502 may be followed by IPv6 extensions in a linked list manner providing more information about the packet. Next header field 1506 in the IPv6 header 1502 or in a given IPv6 extension is a link to the next IPv6 extension etc. An example IPv6 extension is segment routing header (SRH) 1508 and is shown in FIG. 15. SRH 1508 is usually used for routing and may be used to route a packet across a list of IPv6 addresses from one network node to another. SRH 1508 includes a segment list 1510 that includes a list of IPv6 addresses to which the packet should be sent. SRH 1508 includes a segment identification field 1512 which is a counter and is called "segments left" in FIG. 15 and points to the current segment in the segment list 1510 being processed.

Each network node copies the current segment to the IPv6 header destination address 1514 and reduces the "segments left" value by one. The packet is forwarded to the address copied into the destination address. The next node does the same, and so on. The parser engine 17 and steering engine 21 of each network node may be configured to perform the above processing as described in more detail below.

The steps of blocks 902 and 904 of FIG. 9 are performed to yield the first parsed data, which includes segment identification field 1512, which may include the "segments left" value. As previously mentioned, the header section may include multiple segments of segment list 1510 with corresponding addresses (e.g., IPv6 addresses). The steering engine 21 is configured to receive the first parsed data, which includes segment identification field 1512 (block 1402). The steering engine 21 is configured to compute an indication of a location of a current segment of the multiple segments of segment list 1510 based on the segment identification field 1512 (block 1404). The steering engine 21 is configured to generate the parsing information to include the indication of the location of the current segment found in the step of block 1404 (block 1406). The steering engine 21 is configured to provide the parsing information to the parser engine 17 (block 1408). The parser engine 17 is configured to find and parse the current segment based on the indication of the location in the parsing information yielding second parsed data, which optionally includes a given destination address of the addresses included in the segment list 1510 (block 1410). The steering engine 21 is configured to receive the second parsed data. In some embodiments, the steering engine 21 is configured to add the given destination address (included in the current segment) to destination address field 1514 in the header section 1502 of the packet (block 1412), reduce the segment left value of the segment identification field 1512 by one (block 1414), and cause the packet to be forwarded to a device identified by the destination address field 1514 (block 1416).

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A network device, comprising:

an interface configured to receive packets over a network;

a parser engine configured to:

receive data of a header section of a packet; and parse the header section of the packet, including parsing at least one first part of the header section yielding first parsed data; and a steering engine configured to:

receive the first parsed data from the parser engine;

generate parsing information for use in parsing at least one second part of the header section; and provide the parsing information to the parser engine to reparse the header section, wherein: the parser engine is configured to reparse the header section, including parsing the at least one second part of the header section based on the parsing information yielding second parsed data; and the steering engine is configured to perform an action based on the second parsed data.

2. The device according to claim 1, wherein the steering engine is configured to:

perform a computation based on the first parsed data; and generate the parsing information based on a result of the computation.

3. The device according to claim 1, wherein the parsing information includes: an indication of a location in the header section of a given header to parse; and an indication of a protocol of the given header.

4. The device according to claim 1, wherein the parsing information includes an indication of a protocol of a given header.

5. The device according to claim 1, wherein the parsing information includes: an indication of a location in the header section of a given field to parse; and a length of the given field.

6. The device according to claim 1, wherein the parsing information includes: an indication of a first header of the header section; an offset in the header section from the first header to a second header to parse; and an indication of a protocol of the second header.

7. The device according to claim 1, wherein:

the parser engine is configured to parse multiple headers of the header section yielding the first parsed data until reaching an unknown header that has a protocol that is unknown to the parser engine based on the data of the header section;

the steering engine is configured to perform a multi-field lookup based on the first parsed data to identify the unknown header as a header of a given protocol;

the steering engine is configured to generate the parsing information to include an indication of the given protocol and an indication of a location of the unknown header;

the parser engine is configured to find the unknown header based on the indication of the location in the parsing information; and the parser engine is configured to parse the unknown header according to the given protocol based on the indication of the given protocol included in the parsing information yielding the second parsed data.

8. The device according to claim 7, wherein:

the given protocol of the unknown header is a security protocol;

the steering engine is configured to decrypt the packet based on the second parsed data and the security protocol yielding a decrypted packet;

the steering engine is configured to find a trailer of the decrypted packet;

the steering engine is configured to find a next protocol of a next header of the header section based on the found trailer;

the steering engine is configured to compute additional parsing information including an indication of a location of the next header and an indication of the next protocol;

the steering engine is configured to provide the additional parsing information to the parser engine;

the parser engine is configured to find the next header based on the indication of the location in the additional parsing information; and the parser engine is configured to parse the next header according to the next protocol based on the indication of the next protocol included in the additional parsing information yielding third parsed data.

9. The device according to claim 1, wherein:

the steering engine is configured to decrypt the packet based on the first parsed data yielding a decrypted packet;

the steering engine is configured to extract a trailer located after a payload of the decrypted packet;

the steering engine is configured to identify a next protocol of a next header of the header section based on the extracted trailer;

the steering engine is configured to compute the parsing information including an indication of a location of the next header and an indication of the next protocol;

the steering engine is configured to provide the parsing information to the parser engine;

the parser engine is configured to find the next header based on the indication of the location in the parsing information; and the parser engine is configured to parse the next header according to the next protocol based on the indication of the next protocol included in the parsing information yielding the second parsed data.

10. The device according to claim 1, wherein:

the first parsed data includes: weights and flags, the flags indicating that a given part of the header section exists in optional fields;

the steering engine is configured to compute a weighted sum of the flags based on the flags and the weights yielding an indication of a location of the given part of the header section;

the steering engine is configured to generate the parsing information to include the indication of the location of the given part; and the parser engine is configured to find and parse the given part based on the indication of the location in the parsing information yielding the second parsed data.

11. The device according to claim 10, wherein the given part is an optional type-length-value (TLV) header.

12. The device according to claim 1, wherein:

the first parsed data includes a segment identification field;

the header section includes multiple segments;

the steering engine is configured to compute an indication of a location of a current segment of the multiple segments based on the segment identification field;

the steering engine is configured to generate the parsing information to include the indication of the location of the current segment; and the parser engine is configured to find and parse the current segment based on the indication of the location in the parsing information yielding the second parsed data.

13. The device according to claim 1, wherein:

the first parsed data includes a segment identification field;

the header section includes multiple segments with corresponding destination addresses of network nodes across which to route the packet;

the steering engine is configured to compute an indication of a location of a current segment of the multiple segments based on the segment identification field;

the steering engine is configured to generate the parsing information to include the indication of the location of the current segment;

the parser engine is configured to find and parse the current segment based on the indication of the location in the parsing information yielding the second parsed data including a given destination address of the destination addresses;

the steering engine is configured to add the given destination address to a destination address field in the header section; and the steering engine is configured to cause the packet to be forwarded to a device identified by the destination address field.

14. The device according to claim 13, wherein:

the segment identification field points to the current segment in a segment list; and the steering engine is configured to reduce a value of the segment identification field by one.

15. A networking method, comprising:

receiving packets over a network;

parsing the header section of a packet in a parser engine, including parsing at least one first part of the header section of the packet yielding first parsed data;

receiving the first parsed data in a steering engine from the parser engine;

generating parsing information in the steering engine for use in parsing at least one second part of the header section;

providing the parsing information to the parser engine to reparse the header section;

reparsing the header section by the parser engine, including parsing the at least one second part of the header section based on the parsing information yielding second parsed data; and performing an action in the steering engine based on the second parsed data.

16. The method according to claim 15, further comprising:

performing a computation in the steering engine based on the first parsed data; and generating the parsing information in the steering engine based on a result of the computation.

17. The method according to claim 15, wherein the parsing information includes: an indication of a location in the header section of a given header to parse; and an indication of a protocol of the given header.

18. The method according to claim 15, wherein the parsing information includes an indication of a protocol of a given header.

19. The method according to claim 15, wherein the parsing information includes: an indication of a location in the header section of a given field to parse; and a length of the given field.

20. The method according to claim 15, wherein the parsing information includes: an indication of a first header of the header section; an offset in the header section from the first header to a second header to parse; and an indication of a protocol of the second header.

21. The method according to claim 15, further comprising:

parsing multiple headers of the header section yielding the first parsed data until reaching an unknown header that has a protocol that is unknown to the parser engine based on the data of the header section;

performing a multi-field lookup based on the first parsed data to identify the unknown header as a header of a given protocol;

generating the parsing information to include an indication of the given protocol and an indication of a location of the unknown header;

finding the unknown header based on the indication of the location in the parsing information; and parsing the unknown header according to the given protocol based on the indication of the given protocol included in the parsing information yielding the second parsed data.

22. The method according to claim 21, wherein the given protocol of the unknown header is a security protocol, the method further comprising:

decrypting the packet based on the second parsed data and the security protocol yielding a decrypted packet;

finding a trailer of the decrypted packet;

finding a next protocol of a next header of the header section based on the found trailer;

computing additional parsing information including an indication of a location of the next header and an indication of the next protocol;

providing the additional parsing information to the parser engine;

finding the next header based on the indication of the location in the additional parsing information; and parsing the next header according to the next protocol based on the indication of the next protocol included in the additional parsing information yielding third parsed data.

23. The method according to claim 15, further comprising:

decrypting the packet based on the first parsed data yielding a decrypted packet;

extracting a trailer located after a payload of the decrypted packet;

identifying a next protocol of a next header of the header section based on the extracted trailer;

computing the parsing information including an indication of a location of the next header and an indication of the next protocol;

providing the parsing information to the parser engine;

finding the next header based on the indication of the location in the parsing information; and parsing the next header according to the next protocol based on the indication of the next protocol included in the parsing information yielding the second parsed data.

24. The method according to claim 15, wherein the first parsed data includes: weights and flags, the flags indicating that a given part of the header section exists in optional fields, the method further comprising:

computing a weighted sum of the flags based on the flags and the weights yielding an indication of a location of the given part of the header section;

generating the parsing information to include the indication of the location of the given part; and finding and parsing the given part based on the indication of the location in the parsing information yielding the second parsed data.

25. The method according to claim 24, wherein the given part is an optional type-length-value (TLV) header.

26. The method according to claim 15, wherein: the first parsed data includes a segment identification field; and the header section includes multiple segments, the method further comprising:

computing an indication of a location of a current segment of the multiple segments based on the segment identification field;

generating the parsing information to include the indication of the location of the current segment; and finding and parsing the current segment based on the indication of the location in the parsing information yielding the second parsed data.

27. The method according to claim 15, wherein: the first parsed data includes a segment identification field; and the header section includes multiple segments with corresponding destination addresses of network nodes across which to route the packet, the method further comprising:

computing an indication of a location of a current segment of the multiple segments based on the segment identification field;

generating the parsing information to include the indication of the location of the current segment;

finding and parsing the current segment based on the indication of the location in the parsing information yielding the second parsed data including a given destination address of the addresses;

adding the given destination address to a destination address field in the header section; and causing the packet to be forwarded to a device identified by the destination address field.

28. The method according to claim 27, wherein the segment identification field points to the current segment in a segment list, the method further comprising reducing a value of the segment identification field by one.

* * * * *